United States Patent
Jang

(10) Patent No.: US 12,278,371 B2
(45) Date of Patent: *Apr. 15, 2025

(54) PHOSPHAZENE COMPOUND-BASED ELASTIC POLYMER-ENCAPSULATED ANODE PARTICLES FOR LITHIUM BATTERIES AND METHOD OF MANUFACTURING

(71) Applicant: Global Graphene Group, Inc., Dayton, OH (US)

(72) Inventor: Bor Z. Jang, Centerville, OH (US)

(73) Assignee: Honeycomb Battery Company, Dayton, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/166,026

(22) Filed: Feb. 3, 2021

(65) Prior Publication Data

US 2022/0246936 A1    Aug. 4, 2022

(51) Int. Cl.

| | |
|---|---|
| *H01M 4/60* | (2006.01) |
| *H01M 4/04* | (2006.01) |
| *H01M 4/36* | (2006.01) |
| *H01M 4/583* | (2010.01) |
| *H01M 10/0525* | (2010.01) |
| *H01M 4/02* | (2006.01) |

(52) U.S. Cl.
CPC ......... *H01M 4/608* (2013.01); *H01M 4/0497* (2013.01); *H01M 4/366* (2013.01); *H01M 4/583* (2013.01); *H01M 10/0525* (2013.01); *H01M 2004/021* (2013.01)

(58) Field of Classification Search
CPC ...... H01M 4/608; H01M 4/606; H01M 4/602; H01M 4/0497; H01M 4/366; H01M 4/583; H01M 4/581; H01M 10/0525; H01M 10/052; H01M 2004/021

See application file for complete search history.

(56) References Cited

U.S. PATENT DOCUMENTS

| | | | |
|---|---|---|---|
| 2005/0136330 A1* | 6/2005 | Mao | H01M 4/0416 |
| | | | 429/231.95 |
| 2019/0273249 A1* | 9/2019 | Zhamu | H01M 4/131 |
| 2022/0246937 A1* | 8/2022 | Jang | C08L 43/02 |

OTHER PUBLICATIONS

U.S. Appl. No. 17/069,405, filed Oct. 13, 2020, Hui He.
U.S. Appl. No. 17/118,980, filed Dec. 11, 2020, Aruna Zharmu.

* cited by examiner

*Primary Examiner* — Raymond Alejandro

(57) ABSTRACT

A composite particulate for a lithium battery, wherein the composite particulate has a diameter from 10 nm to 50 μm and comprises one or more than one anode active material particles that are dispersed in a high-elasticity polymer matrix or encapsulated by a high-elasticity polymer shell, wherein said high-elasticity polymer matrix or shell has a recoverable elastic tensile strain no less than 5%, when measured without an additive or reinforcement dispersed therein, and a lithium ion conductivity no less than $10^{-8}$ S/cm at room temperature and wherein the high-elasticity polymer comprises a crosslinked polymer network of chains derived from a phosphazene compound.

28 Claims, 8 Drawing Sheets

PHOSPHAZENE COMPOUND-BASED ELASTIC POLYMER-ENCAPSULATED ANODE PARTICLES FOR LITHIUM BATTERIES AND METHOD OF MANUFACTURING

FIELD

The present disclosure relates generally to the field of rechargeable lithium battery and, more particularly, to the anode active materials in the form of high-elasticity polymer-protected particles and the process for producing same.

BACKGROUND

A unit cell or building block of a lithium-ion battery is typically composed of an anode current collector, an anode or negative electrode layer (containing an anode active material responsible for storing lithium therein, a conductive additive, and a resin binder), an electrolyte and porous separator, a cathode or positive electrode layer (containing a cathode active material responsible for storing lithium therein, a conductive additive, and a resin binder), and a separate cathode current collector. The electrolyte is in ionic contact with both the anode active material and the cathode active material. A porous separator is not required if the electrolyte is a solid-state electrolyte.

The binder in the binder layer is used to bond the anode active material (e.g. graphite or Si particles) and a conductive filler (e.g. carbon black or carbon nanotube) together to form an anode layer of structural integrity, and to bond the anode layer to a separate anode current collector, which acts to collect electrons from the anode active material when the battery is discharged. In other words, in the negative electrode (anode) side of the battery, there are typically four different materials involved: an anode active material, a conductive additive, a resin binder (e.g. polyvinylidine fluoride, PVDF, or styrene-butadiene rubber, SBR), and an anode current collector (typically a sheet of Cu foil). Typically the former three materials form a separate, discrete anode layer and the latter one forms another discrete layer.

The most commonly used anode active materials for lithium-ion batteries are natural graphite and synthetic graphite (or artificial graphite) that can be intercalated with lithium and the resulting graphite intercalation compound (GIC) may be expressed as $Li_xC_6$, where x is typically less than 1. The maximum amount of lithium that can be reversibly intercalated into the interstices between graphene planes of a perfect graphite crystal corresponds to x=1, defining a theoretical specific capacity of 372 mAh/g.

Graphite or carbon anodes can have a long cycle life due to the presence of a protective solid-electrolyte interface layer (SEI), which results from the reaction between lithium and the electrolyte (or between lithium and the anode surface/edge atoms or functional groups) during the first several charge-discharge cycles. The lithium in this reaction comes from some of the lithium ions originally intended for the charge transfer purpose. As the SEI is formed, the lithium ions become part of the inert SEI layer and become irreversible, i.e. these positive ions can no longer be shuttled back and forth between the anode and the cathode during charges/discharges. Therefore, it is desirable to use a minimum amount of lithium for the formation of an effective SEI layer. In addition to SEI formation, the irreversible capacity loss Qi, can also be attributed to graphite exfoliation caused by electrolyte/solvent co-intercalation and other side reactions.

In addition to carbon- or graphite-based anode materials, other inorganic materials that have been evaluated for potential anode applications include metal oxides, metal nitrides, metal sulfides, and the like, and a range of metals, metal alloys, and intermetallic compounds that can accommodate lithium atoms/ions or react with lithium. Among these materials, lithium alloys having a composition formula of $Li_aA$ (A is a metal or semiconductor element, such as Al and Si, and "a" satisfies $0<a\leq5$) are of great interest due to their high theoretical capacity, e.g., $Li_4Si$ (3,829 mAh/g), $Li_{4.4}Si$ (4,200 mAh/g), $Li_{4.4}Ge$ (1,623 mAh/g), $Li_{4.4}Sn$ (993 mAh/g), $Li_3Cd$ (715 mAh/g), $Li_3Sb$ (660 mAh/g), $Li_{4.4}Pb$ (569 mAh/g), LiZn (410 mAh/g), and $Li_3Bi$ (385 mAh/g). However, as schematically illustrated in FIG. 2(A), in an anode composed of these high-capacity materials, severe pulverization (fragmentation of the alloy particles) occurs during the charge and discharge cycles due to severe expansion and contraction of the anode active material particles induced by the insertion and extraction of the lithium ions in and out of these particles. The expansion and contraction, and the resulting pulverization, of active material particles, lead to loss of contacts between active material particles and conductive additives and loss of contacts between the anode active material and its current collector. These adverse effects result in a significantly shortened charge-discharge cycle life.

To overcome the problems associated with such mechanical degradation, three technical approaches have been proposed:

(1) reducing the size of the active material particle, presumably for the purpose of reducing the total strain energy that can be stored in a particle, which is a driving force for crack formation in the particle. However, a reduced particle size implies a higher surface area available for potentially reacting with the liquid electrolyte to form a higher amount of SEI. Such a reaction is undesirable since it is a source of irreversible capacity loss.

(2) depositing the electrode active material in a thin film form directly onto a current collector, such as a copper foil. However, such a thin film structure with an extremely small thickness-direction dimension (typically much smaller than 500 nm, often necessarily thinner than 100 nm) implies that only a small amount of active material can be incorporated in an electrode (given the same electrode or current collector surface area), providing a low total lithium storage capacity and low lithium storage capacity per unit electrode surface area (even though the capacity per unit mass can be large). Such a thin film must have a thickness less than 100 nm to be more resistant to cycling-induced cracking, further diminishing the total lithium storage capacity and the lithium storage capacity per unit electrode surface area. Such a thin-film battery has very limited scope of application. A desirable and typical electrode thickness is from 100 μm to 200 μm. These thin-film electrodes (with a thickness of <500 nm or even <100 nm) fall short of the required thickness by three (3) orders of magnitude, not just by a factor of 3.

(3) using a composite composed of small electrode active particles protected by (dispersed in or encapsulated by) a less active or non-active matrix, e.g., carbon-coated Si particles, sol gel graphite-protected Si, metal oxide-coated Si or Sn, and monomer-coated Sn nano particles. Presumably, the protective matrix provides a cushioning effect for particle expansion or shrinkage, and prevents the electrolyte from contacting and reacting with the electrode active material. Examples of high-capacity anode active particles are Si, Sn, and $SnO_2$. Unfortunately, when an active material particle, such as Si particle, expands (e.g. up to a volume expansion of 380%) during the battery charge step, the protective coating is easily broken due to the mechanical weakness and/o brittleness of the protective coating materials. There has been no high-strength and high-toughness material available that is itself also lithium ion conductive.

It may be further noted that the coating or matrix materials used to protect active particles (such as Si and Sn) are carbon, sol gel graphite, metal oxide, monomer, ceramic, and lithium oxide. These protective materials are all very brittle, weak (of low strength), and/or non-conducting (e.g., ceramic or oxide coating). Ideally, the protective material should meet the following requirements: (a) The coating or matrix material should be of high strength and stiffness so that it can help to refrain the electrode active material particles, when lithiated, from expanding to an excessive extent. (b) The protective material should also have high fracture toughness or high resistance to crack formation to avoid disintegration during repeated cycling. (c) The protective material must be inert (inactive) with respect to the electrolyte, but be a good lithium ion conductor. (d) The protective material must not provide any significant amount of defect sites that irreversibly trap lithium ions. (e) The protective material must be lithium ion-conducting as well as electron-conducting. The prior art protective materials all fall short of these requirements. Hence, it was not surprising to observe that the resulting anode typically shows a reversible specific capacity much lower than expected. In many cases, the first-cycle efficiency is extremely low (mostly lower than 80% and some even lower than 60%). Furthermore, in most cases, the electrode was not capable of operating for a large number of cycles. Additionally, most of these electrodes are not high-rate capable, exhibiting unacceptably low capacity at a high discharge rate.

Due to these and other reasons, most of prior art composite electrodes and electrode active materials have deficiencies in some ways, e.g., in most cases, less than satisfactory reversible capacity, poor cycling stability, high irreversible capacity, ineffectiveness in reducing the internal stress or strain during the lithium ion insertion and extraction steps, and other undesirable side effects.

Complex composite particles of particular interest are a mixture of separate Si and graphite particles dispersed in a carbon matrix; e.g. those prepared by Mao, et al. ["Carbon-coated Silicon Particle Powder as the Anode Material for Lithium Batteries and the Method of Making the Same," US 2005/0136330 (Jun. 23, 2005)]. Also of interest are carbon matrix-containing complex nano Si (protected by oxide) and graphite particles dispersed therein, and carbon-coated Si particles distributed on a surface of graphite particles Again, these complex composite particles led to a low specific capacity or for up to a small number of cycles only. It appears that carbon by itself is relatively weak and brittle and the presence of micron-sized graphite particles does not improve the mechanical integrity of carbon since graphite particles are themselves relatively weak. Graphite was used in these cases presumably for the purpose of improving the electrical conductivity of the anode material. Furthermore, polymeric carbon, amorphous carbon, or pre-graphitic carbon may have too many lithium-trapping sites that irreversibly capture lithium during the first few cycles, resulting in excessive irreversibility.

In summary, the prior art has not demonstrated a composite material that has all or most of the properties desired for use as an anode active material in a lithium-ion battery. Thus, there is an urgent and continuing need for a new anode active material that enables a lithium-ion battery to exhibit a high cycle life, high reversible capacity, low irreversible capacity, small particle sizes (for high-rate capacity), and compatibility with commonly used electrolytes. There is also a need for a method of readily or easily producing such a material in large quantities.

Thus, it is an object of the present disclosure to meet these needs and address the issues associated the rapid capacity decay of a lithium battery containing a high-capacity anode active material.

SUMMARY

The present disclosure provides a solid powder mass of composite particulates for use as an anode material in a lithium battery, wherein at least one of the composite particulates (preferably a majority or all of these particulates or "secondary particles") has a diameter from 10 nm to 50 µm (preferably from 50 nm to 10 µm) and comprises one or a plurality of anode active material particles (the "primary particles") that are dispersed in a high-elasticity polymer matrix or encapsulated by a shell of a high-elasticity polymer having a recoverable tensile strain no less than 5% (typically from 5% to 700% and more typically from 10% to 300%), when measured without an additive or reinforcement, and a lithium ion conductivity no less than $10^{-8}$ S/cm (preferably >$10^{-6}$ S/cm, further preferably >$10^{-4}$ S/cm, and more preferably >$10^{-3}$ S/cm) when measured at room temperature, wherein the polymer matrix forms a continuous material phase.

When the high-elasticity polymer serves as a matrix in the composite particulate, this material forms a continuous phase that makes physical and ionic contact with all the anode active material particles dispersed in this continuous phase (matrix).

The disclosed multiple individual composite particulates can form a powder mass. In each particulate, the high-elasticity polymer serves as an encapsulating shell to enclose one or more than one anode primary particles inside the shell of a particulate. In a particulate, the high-elasticity polymer may serve as a matrix in which multiple anode primary particles are dispersed.

It may be noted that the high-elasticity polymer here is not a binder for use in forming an anode electrode; once crosslinked, the polymer no longer is capable of serving as a binder. These composite particulates are individual, isolated entities that are not bonded together. During the subsequent anode fabrication procedure (e.g., slurry coating on Cu foil), a binder (e.g., PVDF) will be used to bond these individual composite particulates, along with a conductive additive together, to form a layer of electrode and to bond this layer of anode electrode to a current collector (e.g., Cu foil).

In certain embodiments, the disclosure provides a composite particulate for a lithium battery, wherein said composite particulate has a diameter from 10 nm to 50 µm and comprises one or more than one anode active material particles that are dispersed in a high-elasticity polymer matrix or encapsulated by a high-elasticity polymer shell, wherein the high-elasticity polymer matrix or shell has a recoverable elastic tensile strain no less than 5%, when measured without an additive or reinforcement dispersed therein, and a lithium ion conductivity no less than $10^{-8}$ S/cm at room temperature and wherein the high-elasticity polymer comprises a crosslinked polymer network of chains derived from a phosphazene compound.

In certain embodiments, the polymer comprises a polyphosphazene selected from the groups consisting of (a) linear polymers having the formula $(N=PR^1R^2)_n$, where $R^1$ and $R^2$ are organic; (b) cyclolinear and cyclomatrix polymers in which small phosphazene rings are connected together by organic chain units; (c) block copolymer, star, dendritic, or comb-type structures; and combinations thereof.

In certain embodiments, the phosphazene compound is synthesized from a precursor monomer, oligomer, or reactive polymer selected from Chemical formula 1, Chemical formula 2, Chemical formula 3, Chemical formula 4, or a combination thereof:

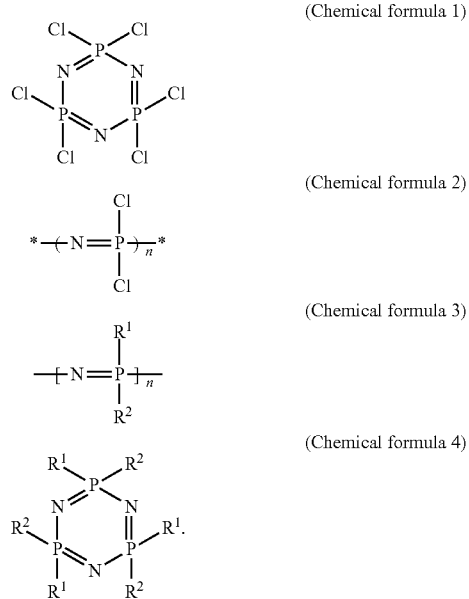

(Chemical formula 1)

(Chemical formula 2)

(Chemical formula 3)

(Chemical formula 4)

wherein R, $R^1$ and $R^2$ are independently selected from an organic group or an organometallic group.

Polyphosphazenes, also commonly referred to as poly(organo)phosphazenes, are a family of inorganic molecular hybrid polymers based on a phosphorus-nitrogen backbone substituted with organic side groups which show a broad array of unique properties due to the vast array of organic substituents possible.

The method of synthesizing polyphosphazenes depends on the desired type of polyphosphazene. A wide variety of reactive phosphazene compounds are available as a potential reactive precursor material (monomer, oligomer, or reactive polymer). In the present specification, a reactive phosphazene compound can mean a monomer, oligomer, or reactive polymer that can be chemically reacted (i.e., can undergo polymerization, including copolymerization, functional group substitution, such as replacing Cl— with an organic or organometallic group, and/or crosslinking). A curing agent refers to an initiator, catalyst, substituent (e.g., an organic or organometallic group), and/or a crosslinking agent that enables the desired chemical reaction (polymerization, substitution, and/or crosslinking).

The most widely used method for linear phosphazene polymers is based on a two-step process. In the first step, as an example, hexachlorocyclotriphosphazene, $(NPCl_2)_3$ (Chemical formula 1) is heated in a sealed system at 250° C. to convert it to a long chain linear polymer, $[NPCl_2]n$ (or Chemical formula 2), having typically 15,000 or more repeating units. This reaction is illustrated in the following Reaction 1:

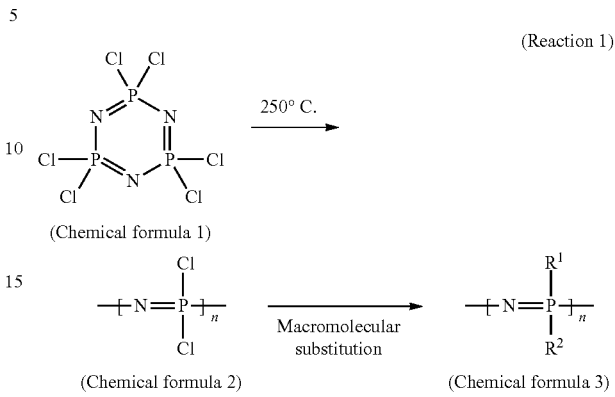

(Reaction 1)

(Chemical formula 1)

(Chemical formula 2)   Macromolecular substitution   (Chemical formula 3)

In the second step the chlorine atoms linked to phosphorus in the polymer are replaced by organic groups through reactions with $R^1$ or $R^2$ to form Chemical formula 3, where $R^1$ and $R^2$ are organic or organometallic groups (there is no particular restriction on the types of organic or organometallic groups that can be chosen). Preferably, $R^1$ and $R^2$ may be independently selected from alkoxides, aryloxides, amines, or organometallic groups, etc. Many different reagents (or called substituting agents or, simply "substituents") can be used in this macromolecular substitution reaction and, hence, a large number of different polymers can be produced. All these polymers are herein referred to as a polyphosphazene.

Polyphosphazene polymers include a wide range of hybrid inorganic-organic polymers with a number of different skeletal architectures that has the backbone —P—N—P—N—P—N—. In nearly all of these materials, two organic side groups are attached to each phosphorus center. Examples of phosphazene polymers include the following:

a) Linear polymers have the formula $(N=PR^1R^2)_n$, where $R^1$ and $R^2$ are organic;

b) Cyclolinear and cyclomatrix polymers in which small phosphazene rings are connected together by organic chain units.

c) Block copolymer, star, dendritic, or comb-type structures.

More than 700 different polyphosphazenes are known, with different side groups (R) and different molecular architectures.

For discussion purposes, polyphosphazenes may be conveniently divided into two major classes-those in which the side groups are attached to phosphorus via oxygen (P—OR) or nitrogen (P—$NR_2$) linkages and those in which the substituents are attached directly to phosphorus through phosphorus-carbon bonds, i.e., the poly(alkyl phosphazenes and poly(aryl phosphazenes). The present disclosure provides both types of polyphosphazenes as an ingredient in the quasi-solid or solid electrolytes.

Preparation of block copolymers, graft polymers with organic side-chains, and other advanced architectures can also be achieved, such as polyphosphazenes with a branched polyphosphazene backbone, supramolecular structures from polyphosphazenes, helical structures with polyphosphazenes, cyclomatrix polyphosphazenes, and dendrimers from hexachloro-cyclotriphosphazene.

The high-elasticity polymer preferably contains a cross-linked network of a phosphazene compound crosslinked by a crosslinking agent to a degree of crosslinking that imparts an elastic tensile strain from 5% to 500%.

The crosslinking agent may be selected from poly(diethanol) diacrylate, poly(ethyleneglycol)dimethacrylate, poly(diethanol) dimethylacrylate, poly(ethylene glycol) diacrylate, N,N-methylene bisacrylamide, epichlorohydrin, 1,4-butanediol diglycidyl ether, tetrabutylammonium hydroxide, cinnamic acid, ferric chloride, aluminum sulfate octadecahydrate, diepoxy, dicarboxylic acid compound, poly(potassium 1-hydroxy acrylate) (PKHA), glycerol diglycidyl ether (GDE), ethylene glycol, polyethylene glycol, polyethylene glycol diglycidyl ether (PEGDE), citric acid, acrylic acid, methacrylic acid, a derivative compound of acrylic acid, a derivative compound of methacrylic acid, glycidyl functions, N,N'-Methylenebisacrylamide (MBAAm), Ethylene glycol dimethacrylate (EGDMAAm), isobornyl methacrylate, poly (acrylic acid) (PAA), methyl methacrylate, isobornyl acrylate, ethyl methacrylate, isobutyl methacrylate, n-Butyl methacrylate, ethyl acrylate, 2-Ethyl hexyl acrylate, n-Butyl acrylate, a diisocyanate, an urethane chain, a chemical derivative thereof, or a combination thereof.

A high-elasticity polymer refers to a polymer, typically a lightly cross-linked polymer, which exhibits an elastic deformation that is at least 5% when measured (without an additive or reinforcement in the polymer) under uniaxial tension. In the field of materials science and engineering, the "elastic deformation" is defined as a deformation of a material (when being mechanically stressed) that is essentially fully recoverable upon release of the load and the recovery is essentially instantaneous. The elastic deformation is preferably greater than 30%, more preferably greater than 50%, further more preferably greater than 100%, still more preferably greater than 150%, and most preferably greater than 200%.

In certain embodiments, the high-elasticity polymer further contains from 0.01% to 30% by weight of a graphite, graphene, or carbon material dispersed therein. The graphite, graphene, or carbon material is preferably selected from polymeric carbon, amorphous carbon, chemical vapor deposition carbon, coal tar pitch, petroleum pitch, meso-phase pitch, carbon black, coke, acetylene black, activated carbon, graphite particles, carbon particles, meso-phase microbeads, carbon or graphite fibers, carbon nanotubes, carbon nano-fibers, graphitic nano-fibers, graphene sheets, or a combination thereof and said graphite, graphene, or carbon material forms a 3D network of electron-conducting pathways. The 3D network of electron-conducting pathways is in electronic or physical contacts with the anode material particles.

The anode active material may be selected from the group consisting of: (a) silicon (Si), germanium (Ge), tin (Sn), lead (Pb), antimony (Sb), phosphorus (P), bismuth (Bi), zinc (Zn), aluminum (Al), titanium (Ti), nickel (Ni), cobalt (Co), and cadmium (Cd); (b) alloys or intermetallic compounds of Si, Ge, Sn, Pb, Sb, Bi, Zn, Al, Ti, Ni, Co, or Cd with other elements; (c) oxides, carbides, nitrides, sulfides, phosphides, selenides, and tellurides of Si, Ge, Sn, Pb, Sb, Bi, Zn, Al, Ti, Fe, Ni, Co, V, or Cd, and their mixtures, composites, or lithium-containing composites; (d) salts and hydroxides of Sn; (e) lithium titanate, lithium manganate, lithium aluminate, lithium titanium niobate, lithium-containing titanium oxide, lithium transition metal oxide, $ZnCo_2O_4$; (f) carbon or graphite particles (g) prelithiated versions thereof; and (h) combinations thereof.

In some embodiments, the anode active material contains a prelithiated Si, prelithiated Ge, prelithiated Sn, prelithiated $SnO_x$, prelithiated $SiO_x$, prelithiated iron oxide, prelithiated $V_2O_5$, prelithiated $V_3O_8$, prelithiated $Co_3O_4$, prelithiated $Ni_3O_4$, or a combination thereof, wherein x=1 to 2.

It may be noted that pre-lithiation of an anode active material means that this material has been pre-intercalated by or doped with lithium ions up to a weight fraction from 0.1% to 54.7% of Li in the lithiated product.

The anode active material is preferably in a form of nano particle (spherical, ellipsoidal, and irregular shape), nano wire, nano fiber, nano tube, nano sheet, nano belt, nano ribbon, nano disc, nano platelet, or nano horn having a thickness or diameter less than 100 nm. These shapes can be collectively referred to as "particles" unless otherwise specified or unless a specific type among the above species is desired. Further preferably, the anode active material has a dimension less than 50 nm, even more preferably less than 20 nm, and most preferably less than 10 nm.

In some embodiments, the anode active material particles (primary particles) contain sub-micron or micron-scale particles that have a thickness or diameter from 100 nm to 20 μm, preferably less than 2 μm.

The primary particles or the secondary particles (or both) can be porous, having pores to accommodate volume expansion of the primary particles, such as Si particles that can undergo a volume expansion up to 380%.

In some embodiments, a cluster of primary particles may be totally embedded in, engulfed by, and dispersed in a matrix of a high-elasticity polymer wherein the polymer forms a continuous phase (hence, the term "matrix") and the primary particles are a dispersed or discrete phase. Alternatively or additionally, a carbon layer may be deposited to embrace or encapsulate the primary particles prior to being dispersed in the polymer matrix.

The particulate may further contain a graphite, graphene, and/or carbon material dispersed in the high-elasticity polymer. The carbon or graphite material may be selected from polymeric carbon, amorphous carbon, chemical vapor deposition carbon, coal tar pitch, petroleum pitch, meso-phase pitch, carbon black, coke, acetylene black, activated carbon, fine expanded graphite particle with a dimension smaller than 100 nm, artificial graphite particle, natural graphite particle, carbon nano-tubes (single-walled or multi-walled), carbon nano-fibers (vapor-grown or carbonized polymer fibers), graphitic nano-fibers, graphene sheets, or a combination thereof. Graphene may be selected from pristine graphene, graphene oxide, reduced graphene oxide, graphene fluoride, hydrogenated graphene, nitrogenated graphene, functionalized graphene, etc.

The carbon/graphite/graphene particles, fibers, nanotubes, and/or nano sheets dispersed in the high-elasticity polymer preferably and typically constitute a 3D network of electron-conducting paths that preferably are in contact with individual primary particles of the anode active material. The high-elasticity polymer matrix, being a continuous phase and making contact with individual primary particles (being substantially totally immersed in the polymer matrix) provide a 3D network of lithium ion-conducting paths. In other words, there are dual networks of conducting pathways for electrons and lithium ions inside the multi-functional composite particulate.

In certain embodiments, a single anode particle or a plurality of anode particles may be encapsulated by a shell of high-elasticity polymer. Some desired amount of carbon, graphite, and/or graphene particles, fibers, nanotubes, and/or nano sheets may also be encapsulated by the high-elasticity polymer; these conductive fillers can constitute a 3D network of electron-conducting paths that preferably are in contact with individual primary particles of the anode active material.

The anode active material primary particles and/or the composite particulates (secondary particles) may be further coated with or embraced by a conductive protective coating, selected from a carbon material, graphene, electronically conductive polymer, conductive metal oxide, or conductive metal coating. Preferably, the anode active material, in the form of a nano particle, nano wire, nano fiber, nano tube, nano sheet, nano belt, nano ribbon, nano disc, nano platelet, or nano horn is pre-intercalated or pre-doped with lithium ions to form a prelithiated anode active material having an amount of lithium from 0.1% to 54.7% by weight of said prelithiated anode active material.

Preferably and typically, the high-elasticity polymer has a lithium ion conductivity no less than $10^{-7}$ S/cm, more preferably no less than $10^{-5}$ S/cm, and most preferably no less than $10^{-4}$ S/cm. Some of the selected polymers exhibit a lithium-ion conductivity greater than $10^{-2}$ S/cm (typically up to $5 \times 10^{-2}$ S/cm). In some embodiments, the high-elasticity polymer is a neat polymer containing no additive or filler dispersed therein. In others, the high-elasticity polymer is polymer matrix composite containing from 0.1% to 50% by weight (preferably from 1% to 35% by weight) of a lithium ion-conducting additive dispersed in a high-elasticity polymer matrix material. In some embodiments, the high-elasticity polymer contains from 0.01% by weight to 30% by weight (preferably from 1% to 15%) of a reinforcement nano filament selected from carbon nanotube, carbon nano-fiber, graphene, or a combination thereof, sufficient to exceed a percolation threshold for forming a 3D network of electron-conducting pathways.

In some embodiments, the high-elasticity polymer is a polymer matrix composite containing a lithium ion-conducting additive dispersed therein, wherein the lithium ion-conducting additive is selected from $Li_2CO_3$, $Li_2O$, $Li_2C_2O_4$, LiOH, LiX, $ROCO_2Li$, HCOLi, ROLi, $(ROCO_2Li)_2$, $(CH_2OCO_2Li)_2$, $Li_2S$, $Li_xSO_y$, or a combination thereof, wherein X=F, Cl, I, or Br, R=a hydrocarbon group, $0<x \leq 1$, $1 \leq y \leq 4$.

In some embodiments, the high-elasticity polymer is a polymer matrix composite containing a lithium ion-conducting additive dispersed therein, wherein the lithium ion-conducting additive contains a lithium salt selected from lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-methanesulfonate ($LiCF_3SO_3$), bis-trifluoromethyl sulfonylimide lithium (LiN$(CF_3SO_2)_2$), lithium bis(oxalato)borate (LiBOB), lithium oxalyldifluoroborate ($LiBF_2C_2O_4$), lithium nitrate ($LiNO_3$), Li-fluoroalkyl-phosphate ($LiPF_3(CF_2CF_3)_3$), lithium bisperfluoro-ethylsulfonylimide (LiBETI), lithium bis(trifluoromethanesulfonyl)imide, lithium bis(fluorosulfonyl)imide, lithium trifluoromethanesulfonimide (LiTFSI), an ionic liquid-based lithium salt, or a combination thereof.

In some embodiments, the high-elasticity polymer is mixed with or forms a co-polymer with an elastomer. The high-elasticity polymer may form a mixture or blend with an electron-conducting polymer selected from polyaniline, polypyrrole, polythiophene, polyfuran, a bi-cyclic polymer, derivatives thereof (e.g., sulfonated versions), or a combination thereof.

In some embodiments, the high-elasticity polymer may form a mixture or blend with a lithium ion-conducting polymer selected from poly(ethylene oxide) (PEO), Poly-propylene oxide (PPO), poly(acrylonitrile) (PAN), poly(methyl methacrylate) (PMMA), poly(vinylidene fluoride) (PVdF), Poly bis-methoxy ethoxyethoxide-phosphazene, Polyvinyl chloride, Polydimethylsiloxane, poly(vinylidene fluoride)-hexafluoropropylene (PVDF-HFP), a sulfonated derivative thereof, or a combination thereof. Sulfonation is herein found to impart improved lithium-ion conductivity to a polymer.

The present disclosure also provides an anode electrode that contains the presently invented multi-functional composite particulates, an optional conductive additive (e.g., expanded graphite flakes, carbon black, acetylene black, or carbon nanotube), an optional resin binder, and, optionally, some amount of the common anode active materials (e.g., particles of natural graphite, synthetic graphite, hard carbon, etc.), if so desired.

The present disclosure also provides a lithium battery containing an optional anode current collector, the presently invented anode as described above, a cathode active material layer, an optional cathode current collector, an electrolyte in ionic contact with the anode active material layer and the cathode active material layer and an optional porous separator. The lithium battery may be a lithium-ion battery, lithium metal battery (containing lithium metal or lithium alloy as the main anode active material and containing no intercalation-based anode active material), lithium-sulfur battery, lithium-selenium battery, or lithium-air battery.

The present disclosure also provides a method of manufacturing the composite particulates described above, the method comprising: (a) dispersing multiple particles of an anode active material in a precursor polymer solution to form a suspension wherein these particles are fully embedded or immersed in said precursor solution, which comprises at least a curing agent (an initiator, catalyst, substituent, and/or crosslinking agent) dissolved or dispersed in a reactive liquid medium that comprises a reactive phosphazene compound, in a form of monomer, oligomer or reactive polymer, and an optional non-aqueous liquid solvent (the monomer itself may be a liquid solvent); (b) operating a secondary particle-forming procedure to shape the suspension into multiple droplets and remove the liquid solvent from the droplets; and (c) curing the reactive phosphazene compound to form said composite particulates wherein a particulate comprises one or a plurality of anode active material particles that are dispersed and embedded in a polymer matrix or encapsulated by a polymer shell.

Preferably, the high-elasticity polymer has a lithium-ion conductivity from $1 \times 10^{-8}$ S/cm to $5 \times 10^{-2}$ S/cm. In some embodiments, the high-elasticity polymer has a recoverable tensile strain from 35% to 700% (more preferably >50%, and most preferably >100%).

These network or cross-linked polymers exhibit a unique combination of a high elasticity (high elastic deformation strain) and high lithium-ion conductivity.

The secondary particle-forming procedure can include a procedure selected from extrusion and pelletizing, pan coating, air suspension, centrifugal extrusion, vibrational nozzle, spray-drying, ultrasonic spraying, coacervation-phase separation, interfacial polycondensation, in-situ polymerization, matrix polymerization, or a combination thereof.

In certain embodiments, the step of dispersing includes dispersing or dissolving a reactive phosphazene polymer (or its precursor, such as polymerizing monomer or oligomer), an electronically conductive polymer or its precursor (e.g., polyaniline, polypyrrole, polythiophene, polyfuran, a bi-cyclic polymer, a sulfonated derivative thereof, or a combination thereof), a lithium-ion conducting material (e.g., lithium ion-conducting polymer and/or lithium salt), a reinforcement material (e.g., carbon nanotube, carbon nanofiber, and/or graphene sheets), a foaming or blowing agent, or a combination thereof, in the suspension.

The foaming or blowing agent is used to generate pores in the particulate. The porosity level may be controlled by adjusting the type and the amount of pores in the suspension. The use of a foaming agent in producing foamed or cellular plastics is well-known in the plastic industry. However, the use of a foaming agent to produce pores in a composite particulate for lithium battery electrode application has not been previously taught or suggested.

The anode active material may be selected from the group consisting of: (a) silicon (Si), germanium (Ge), tin (Sn), lead (Pb), antimony (Sb), phosphorus (P), bismuth (Bi), zinc (Zn), aluminum (Al), titanium (Ti), nickel (Ni), cobalt (Co), and cadmium (Cd); (b) alloys or intermetallic compounds of Si, Ge, Sn, Pb, Sb, Bi, Zn, Al, Ti, Ni, Co, or Cd with other elements; (c) oxides, carbides, nitrides, sulfides, phosphides, selenides, and tellurides of Si, Ge, Sn, Pb, Sb, Bi, Zn, Al, Ti, Fe, Ni, Co, V, or Cd, and their mixtures, composites, or lithium-containing composites; (d) salts and hydroxides of Sn; (e) lithium titanate, lithium manganate, lithium aluminate, lithium titanium niobium oxide, lithium-containing titanium oxide, lithium transition metal oxide, $ZnCo_2O_4$; (f) carbon or graphite particles (g) prelithiated versions thereof; and (h) combinations thereof.

In some embodiments, one or a plurality of anode active material particles is coated with a layer of carbon, graphene, or any other conducting material prior to being dispersed in the polymer matrix.

In some embodiments, the composite particulate is further protected by a coating of a conducting carbon, graphite or graphene material. The graphene sheets may be selected from pristine graphene (e.g., that prepared by CVD or liquid phase exfoliation using direct ultrasonication), graphene oxide, reduced graphene oxide (RGO), graphene fluoride, doped graphene, functionalized graphene, etc.

DESCRIPTION

This disclosure provides an anode (negative electrode) comprising composite particulates (each having one or more than one anode active material particles dispersed in a high-elasticity polymer matrix or encapsulated by a shell of high-elasticity polymer) for a lithium secondary battery, which is preferably a secondary battery based on a non-aqueous electrolyte, a polymer gel electrolyte, an ionic liquid electrolyte, a quasi-solid electrolyte, or a solid-state electrolyte. The shape of a lithium secondary battery can be cylindrical, square, button-like, etc. The present disclosure is not limited to any battery shape or configuration or any type of electrolyte. For convenience, we will primarily use Si, Sn, and $SnO_2$ as illustrative examples of a high-capacity anode active material. This should not be construed as limiting the scope of the disclosure.

Figure 1A:
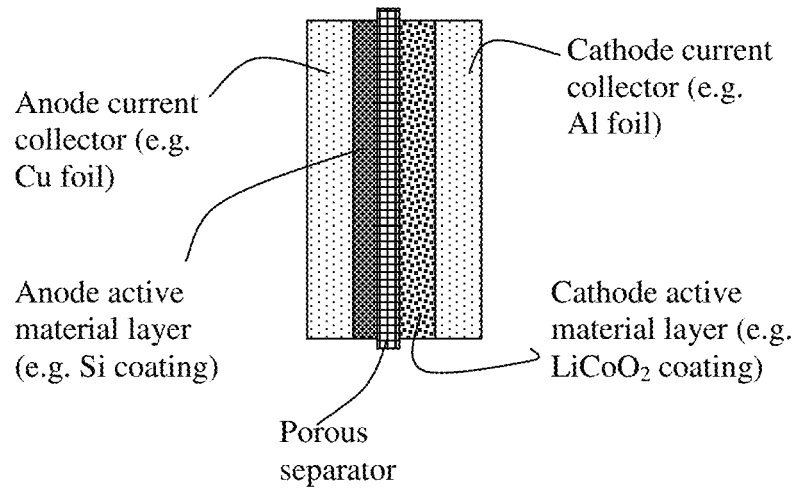
FIG. 1(A) Schematic of a prior art lithium-ion battery cell, wherein the anode layer is a thin coating of an anode active material itself.
Figure 1B:
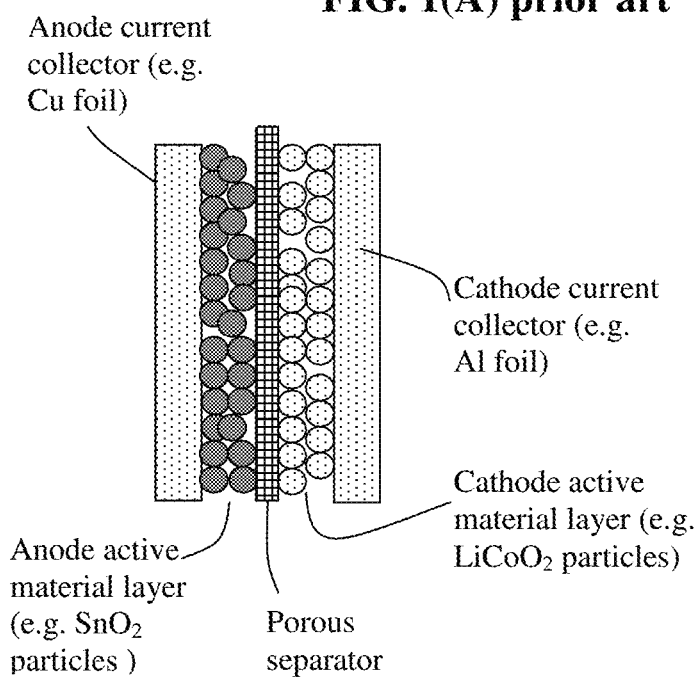
FIG. 1(B) Schematic of another prior art lithium-ion battery; the anode layer being composed of particles of an anode active material, a conductive additive (not shown) and a resin binder (not shown).

As illustrated in FIG. 1(B), a lithium-ion battery cell is typically composed of an anode current collector (e.g. Cu foil), an anode or negative electrode active material layer (i.e. anode layer typically containing particles of an anode active material, conductive additive, and binder), a porous separator and/or an electrolyte component, a cathode or positive electrode active material layer (containing a cathode active material, conductive additive, and resin binder), and a cathode current collector (e.g. Al foil). More specifically, the anode layer is composed of particles of an anode active material (e.g. graphite, Sn, $SnO_2$, or Si), a conductive additive (e.g. carbon black particles), and a resin binder (e.g. SBR or PVDF). This anode layer is typically 50-300 μm thick (more typically 100-200 μm) to give rise to a sufficient amount of current per unit electrode area.

In a less commonly used cell configuration, as illustrated in FIG. 1(A), the anode active material is deposited in a thin film form directly onto an anode current collector, such as a layer of Si coating deposited on a sheet of copper foil. This is not commonly used in the battery industry and, hence, will not be discussed further.

Figure 2A:
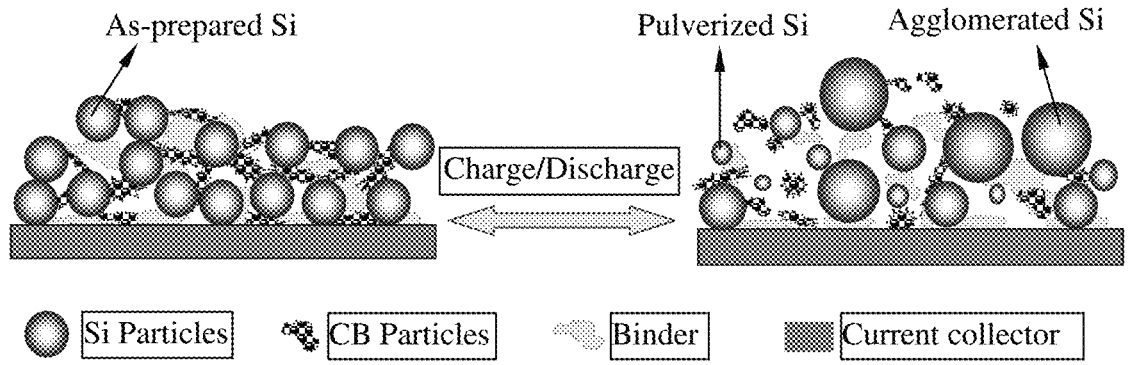
FIG. 2(A) Schematic illustrating the notion that expansion of Si particles, upon lithium intercalation during charging of a prior art lithium-ion battery, can lead to pulverization of Si particles, interruption of the conductive paths formed by the conductive additive, and loss of contact with the current collector.

In order to obtain a higher energy density cell, the anode in FIG. 1(B) can be designed to contain higher-capacity anode active materials having a composition formula of $Li_aA$ (A is a metal or semiconductor element, such as Al and Si, and "a" satisfies $0<a\leq5$). These materials are of great interest due to their high theoretical capacity, e.g., $Li_4Si$ (3,829 mAh/g), $Li_{4.4}Si$ (4,200 mAh/g), $Li_{4.4}Ge$ (1,623 mAh/g), $Li_{4.4}Sn$ (993 mAh/g), $Li_3Cd$ (715 mAh/g), $Li_3Sb$ (660 mAh/g), $Li_{4.4}Pb$ (569 mAh/g), LiZn (410 mAh/g), and $Li_3Bi$ (385 mAh/g). However, as discussed in the Background section, there are several problems associated with the implementation of these high-capacity anode active materials:

1) As schematically illustrated in FIG. 2(A), in an anode composed of these high-capacity materials, severe pulverization (fragmentation of the alloy particles) occurs during the charge and discharge cycles due to severe expansion and contraction of the anode active material particles induced by the insertion and extraction of the lithium ions in and out of these particles. The expansion and contraction, and the resulting pulverization, of active material particles, lead to loss of contacts between active material particles and conductive additives and loss of contacts between the anode active material and its current collector. These adverse effects result in a significantly shortened charge-discharge cycle life.

2) The approach of using a composite composed of small electrode active particles protected by (dispersed in or encapsulated by) a less active or non-active matrix, e.g., carbon-coated Si particles, sol gel graphite-protected Si, metal oxide-coated Si or Sn, and monomer-coated Sn nano particles, has failed to overcome the capacity decay problem. Presumably, the protective matrix provides a cushioning effect for particle expansion or shrinkage, and prevents the electrolyte from contacting and reacting with the electrode active material. Unfortunately, when an active material particle, such as Si particle, expands (e.g. up to a volume expansion of 380%) during the battery charge step, the protective coating is easily broken due to the mechanical weakness and/o brittleness of the protective coating materials. There has been no high-strength and high-toughness material available that is itself also lithium ion conductive.

3) The approach of using a core-shell structure (e.g. Si nano particle encapsulated in a carbon or $SiO_2$ shell) also has not solved the capacity decay issue. As illustrated in upper portion of FIG. 2(B), a non-lithiated Si particle can be encapsulated by a carbon shell to form a core-shell structure (Si core and carbon or $SiO_2$ shell in this example). As the lithium-ion battery is charged, the anode active material (carbon- or $SiO_2$-encapsulated Si particle) is intercalated with lithium ions and, hence, the Si particle expands. Due to the brittleness of the encapsulating shell (carbon), the shell is broken into segments, exposing the underlying Si to electrolyte and subjecting the Si to undesirable reactions with electrolyte during repeated charges/discharges of the battery. These reactions continue to consume the electrolyte and reduce the cell's ability to store lithium ions.

Figure 2B:
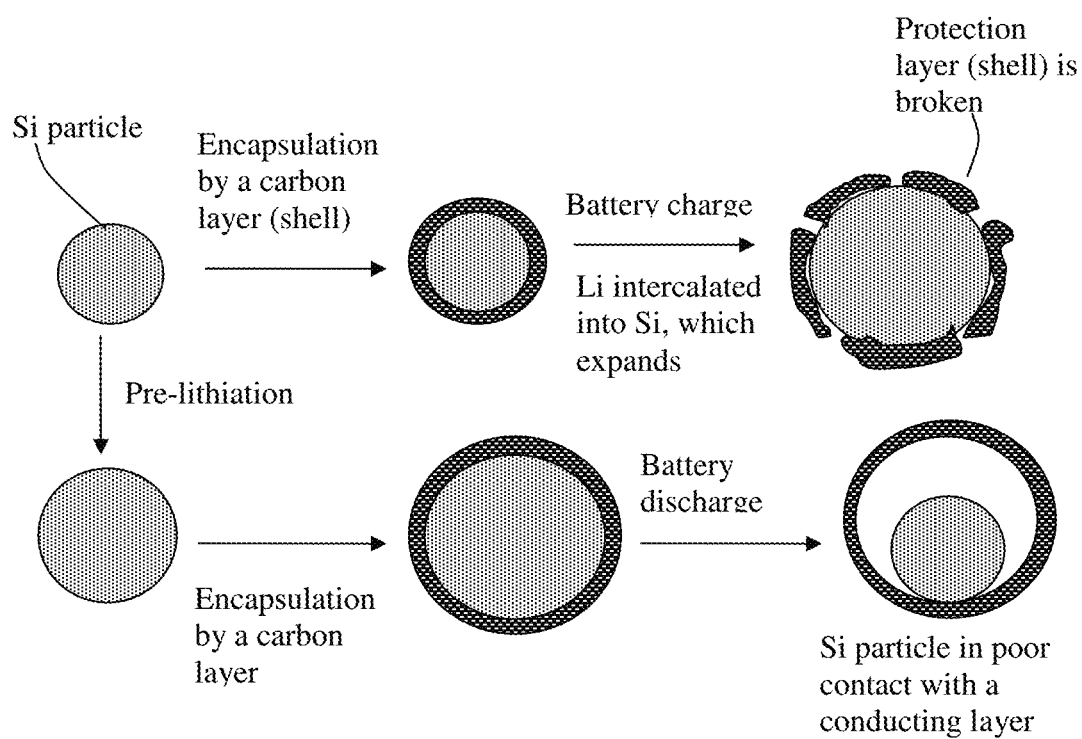
FIG. 2(B) illustrates the issues associated with prior art anode active material; for instance, a non-lithiated Si particle encapsulated by a protective shell (e.g., carbon shell) in a core-shell structure inevitably leads to breakage of the shell and that a pre-lithiated Si particle encapsulated with a protective layer leads to poor contact between the contracted Si particle and the rigid protective shell during battery discharge.

4) Referring to the lower portion of FIG. 2(B), wherein the Si particle has been pre-lithiated with lithium ions; i.e. has been pre-expanded in volume. When a layer of carbon (as an example of a protective material) is encapsulated around the pre-lithiated Si particle, another core-shell structure is formed. However, when the battery is discharged and lithium ions are released (de-intercalated) from the Si particle, the Si particle contracts, leaving behind a large gap between the protective shell and the Si particle. Such a configuration is not conducive to lithium intercalation of the Si particle during the subsequent battery charge cycle due to the gap and the poor contact of Si particle with the protective shell (through which lithium ions can diffuse). This would significantly curtail the lithium storage capacity of the Si particle particularly under high charge rate conditions.

In other words, there are several conflicting factors that should be considered concurrently when it comes to the design and selection of an anode active material in terms of material type, shape, size, porosity, and electrode layer thickness. Thus far, there has been no effective solution offered by any prior art teaching to these often conflicting problems. We have solved these challenging issues that have troubled battery designers and electrochemists alike for more than 30 years by developing the multi-functional composite particulates.

The present disclosure provides a solid powder mass of composite particulates for a lithium battery, wherein at least one of the composite particulates (preferably a majority or all of these particulates or "secondary particles") has a diameter from 50 nm to 50 μm and comprises a plurality of anode active material particles (the "primary particles") that are dispersed in a high-elasticity polymer matrix or encapsulated by a shell of high-elasticity polymer having a recoverable tensile strain no less than 5% (typically from 5% to 700% and more typically from 10% to 300%), when measured without an additive or reinforcement, and a lithium ion conductivity no less than $10^{-8}$ S/cm (preferably $>10^{-4}$ S/cm, more preferably $>10^{-3}$ S/cm) when measured at room temperature. In the structure of a polymer matrix, the polymer forms a continuous material phase. This continuous phase makes physical and ionic contact with all the anode active material particles dispersed in this continuous phase (matrix).

In certain embodiments, the disclosure provides a composite particulate for a lithium battery, wherein said composite particulate has a diameter from 10 nm to 50 μm and comprises one or more than one anode active material particles that are dispersed in a high-elasticity polymer matrix or encapsulated by a high-elasticity polymer shell, wherein the high-elasticity polymer matrix or shell has a recoverable elastic tensile strain no less than 5%, when measured without an additive or reinforcement dispersed therein, and a lithium ion conductivity no less than $10^{-8}$ S/cm at room temperature and wherein the high-elasticity polymer comprises a crosslinked polymer network of chains derived from a phosphazene compound.

Polyphosphazenes, also commonly referred to as poly (organo)phosphazenes, are a family of inorganic molecular hybrid polymers based on a phosphorus-nitrogen backbone substituted with organic side groups which show very differing properties due to the vast array of organic substituents possible. The method of synthesizing polyphosphazenes depends on the desired type of polyphosphazene. The most widely used method for linear polymers is based on a two-step process. In the first step, hexachlorocyclotriphosphazene, $(NPCl_2)_3$ (Chemical formula 1) is heated in a sealed system at 250° C. to convert it to a long chain linear polymer, $[NPCl_2]n$ (or Chemical formula 2), having typically 15,000 or more repeating units. This reaction is illustrated in the following Reaction 1:

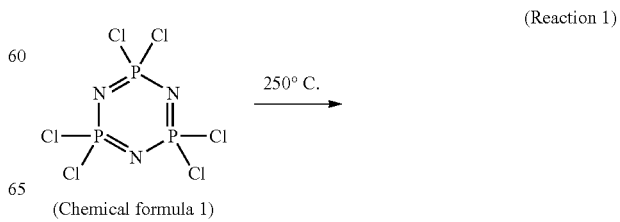

(Reaction 1)

(Chemical formula 1)

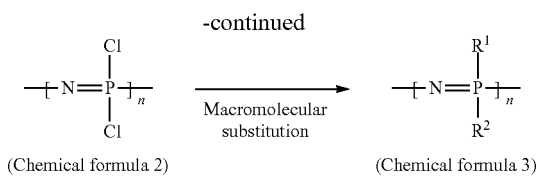

(Chemical formula 2) → (Chemical formula 3)
Macromolecular substitution

In the second step the chlorine atoms linked to phosphorus in the polymer are replaced by organic groups through reactions with $R^1$ or $R^2$ to form Chemical formula 3, where $R^1$ and $R^2$ may be independently selected from alkoxides, aryloxides, amines, or organometallic reagents, etc. Many different reagents can be used in this macromolecular substitution reaction and, hence, a large number of different polymers can be produced. All these polymers are herein referred to as a polyphosphazene. Some examples of the macromolecular substitution are shown below (Reactions 2a, 2b, and 2c):

(Reactions 2a, 2b, and 2c)

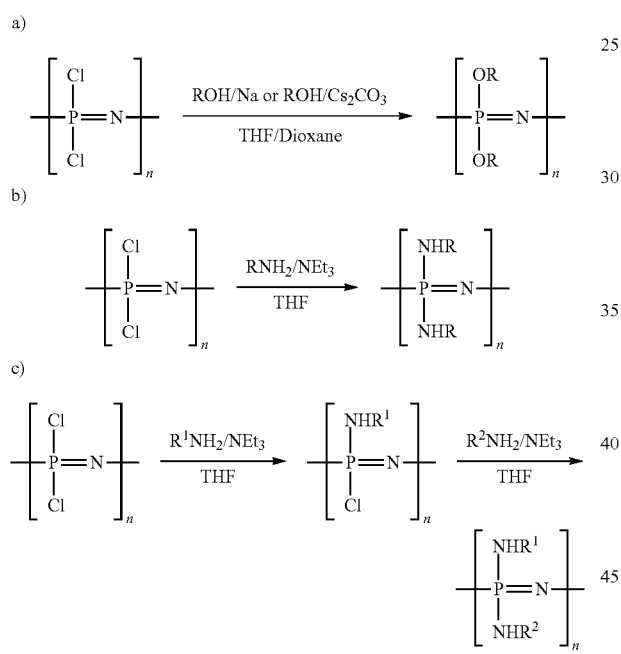

Polyphosphazene polymers include a wide range of hybrid inorganic-organic polymers with a number of different skeletal architectures that has the backbone P—N—P—N—P—N—. In nearly all of these materials two organic side groups are attached to each phosphorus center. Examples of phosphazene polymers include the following:
(a) Linear polymers have the formula $(N=PR^1R^2)_n$, where $R^1$ and $R^2$ are organic;
(b) Cyclolinear and cyclomatrix polymers in which small phosphazene rings are connected together by organic chain units.
(c) Block copolymer, star, dendritic, or comb-type structures.
More than 700 different polyphosphazenes are known, with different side groups (R) and different molecular architectures.

In certain embodiments, the polymer comprises a polyphosphazene selected from the groups consisting of (a) linear polymers having the formula $(N=PR^1R^2)_n$, where $R^1$ and $R^2$ are organic; (b) cyclolinear and cyclomatrix polymers in which small phosphazene rings are connected together by organic chain units; (c) block copolymer, star, dendritic, or comb-type structures; and combinations thereof.

The phosphazene compound may be synthesized from a precursor monomer, oligomer, or reactive polymer selected from Chemical formula 1, Chemical formula 2, Chemical formula 3, Chemical formula 4 or a combination thereof:

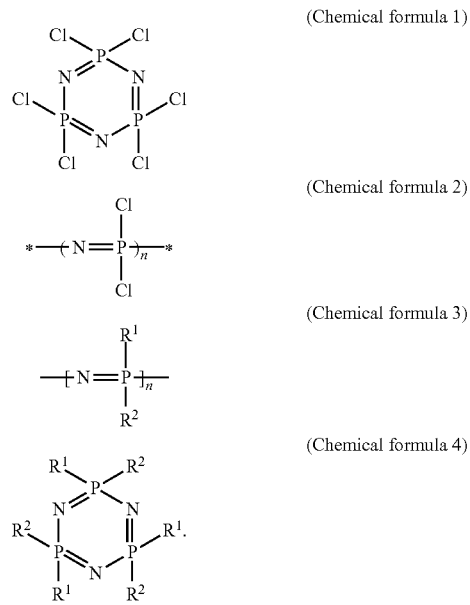

wherein R, $R^1$ and $R^2$ are independently selected from an organic group or an organometallic group.

It may be noted that a high-elasticity polymer may be referred to as an elastomner. Typically, a high-elasticity polymer has the characteristic that it has a low degree of cross-linking or has a long chain between two crosslinking points in the network of polymer chains. We have surprisingly discovered that phosphazene compounds or derivatives typically can self-crosslink or can be crosslinked with a crosslinking agent.

Polyphosphazenes may be conveniently divided into two major classes-those in which the side groups are attached to phosphorus via oxygen (P—OR) or nitrogen (P—NR$_2$) linkages and those in which the substituents are attached directly to phosphorus through phosphorus-carbon bonds, i.e., the poly(alkyl phosphazenes and poly(aryl phosphazenes). The present disclosure provides both types of polyphosphazenes as an ingredient in the quasi-solid or solid electrolytes.

It is also possible to achieve controlled polymerization of [NPCl$_2$]n via a living cationic polymerization of trichlorophosphoranimine (Cl$_3$PNSiMe$_3$). This can be carried out in solution at room temperature via reaction of Cl$_3$PNSiMe$_3$ with two equivalents of PCl$_5$ giving a cationic species [Cl$_3$PNPCl$_3$]$^+$ with PCl$_6^-$ as the counterion (Reaction 3a). This species can initiate the polymerization upon addition of further equivalents of Cl$_3$PNSiMe$_3$ leading to polymer chains with a "living" cationic end group. One equivalent of ClSiMe$_3$ is formed as a side product with every monomer molecule added to the polymer, making this polymerization a rare example of a polycondensation reaction which occurs via a chain growth mechanism (compared to most polycondensation reactions having a step-growth mechanism). The living chain growth mechanism, with one cationic initiator per propagating chain, allows not only control of molecular weight via the feed monomer to initiator ratio, but also leads to poly(dichloro) phosphazenes with a narrow index of polydispersity. Reaction times may vary depending on the desired polymer chain length, the monomer concentration and the nature of the counter ion, but $Cl_3PNSiMe_3$ is observed to be consumed completely relatively quickly within a few hours in dichloromethane.

The living cationic polymerization requires large amounts of the monomer $Cl_3PNSiMe_3$ of high purity, usually prepared via reaction of $PCl_3$ with $LiN(SiMe_3)_2$ to form $Cl_2PN(SiMe_3)_2$, followed by oxidation with the chlorinating agent $SO_2Cl_2$ to give $Cl_3PNSiMe_3$. To incorporate polyphosphazene into a battery cell, we have invented a method to produce $[NPCl_2]_n$ directly via in situ preparation and polymerization of $Cl_3PNSiMe_3$. This route could facilitate upscaling and the industrial preparation of polyphosphazene in a battery, as it avoids the vacuum distillation of the monomer.

When $PCl_5$ is used to form the cationic initiator for the living polymerization of $Cl_3PNSiMe_3$ (Reaction 3a), some bidirectional growth can be observed due to the ability of the cationic propagating site to migrate. Furthermore, both end groups are identical after macro-substitution of the chlorine atoms, thus limiting the options in terms of the preparation of polymers with higher architectures. However, monodirectional growth can be achieved via the use of $R_3PNSiMe_3$ type moieties (Reaction 3b). Reaction of such phosphoranimines with two equivalents of $PCl_5$ gives a cationic species capable of initiating the polymerization of $Cl_3PNSiMe_3$ via an identical mechanism. The R groups, typically phenyl groups, effectively block one end of the initiating species, forcing the polymerization to proceed in only one direction and more importantly resulting in polymers with defined chain ends.

(Reactions 3a, 3b, and 3c)

a)

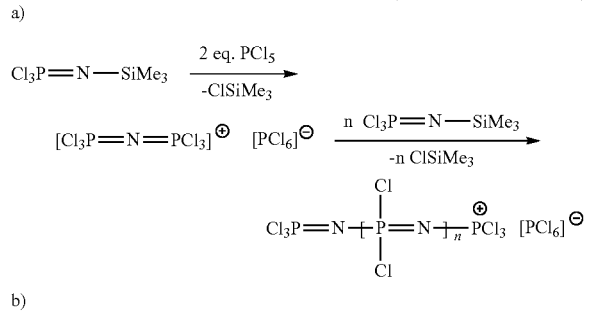

b)

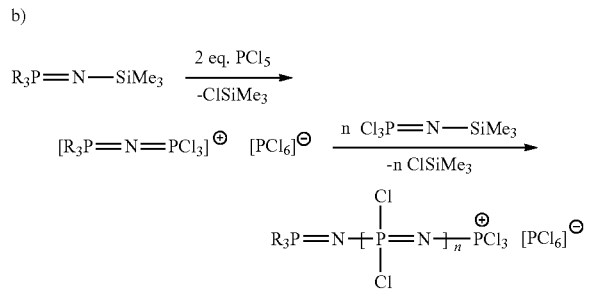

c)

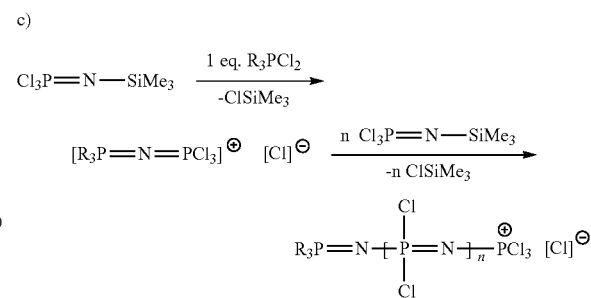

It is also possible to directly synthesize poly(organo) phosphazenes, without going through the $[NPCl_2]n$ precursor route. For instance, one can conduct the anionic polymerization of N-silylphosphoranimines with fluoride ion initiators in the presence of N-methylimidazole (Reaction 4):

(Reactions 4)

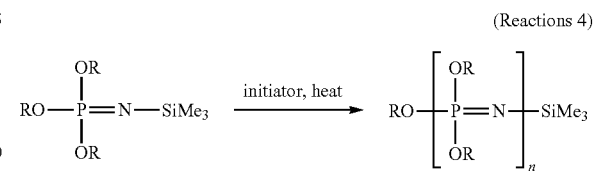

This polymerization has living character and enables the preparation of polymers with an index of polydispersity between 1.3 and 2.3 at 125° C. The polymerization of similar N-silylphosphoranimines can be initiated by $H_2O$ with a catalytic amount of N-methylimidazole with good living polymerization kinetics, enabling robust preparation of poly(bistrifluoroethoxy phosphazene). The same method can be followed to prepare poly(organo)phosphazenes with excellent control of molecular weight and polydispersity from a wider range of monomers.

Poly(alkyl/aryl)phosphazenes, $[NPR_2]n$, whereby the organic substituent is directly attached via a P—C bond, can also be prepared via direct polymerization routes. Initially developed by thermal (100-180° C.) condensation of $(CF_3CH_2O)R_2PQNSiMe_3$ type monomers, this can be used for cationic initiators and with monomers of the type $BrR_2PQNSiMe_3$. The polymerization of halo(alkyl/aryl) phosphoranimines ($XR_2PNSiMe_3$, X=Br or Cl) initiated by organic phosphites $((MeO)_3P$ can be an effective route to poly(alkyl/aryl)phosphazenes at ambient temperature (Reaction 5).

(Reaction 5)

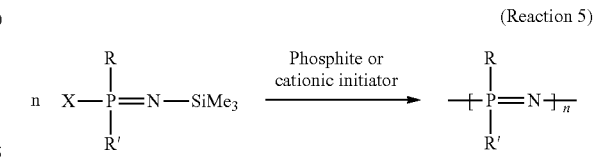

Additionally, such phosphoranimines can be combined with the cationic polymerization of [NPCl$_2$]n (Reaction 6), thus allowing the preparation of block copolymers:

(Reaction 6)

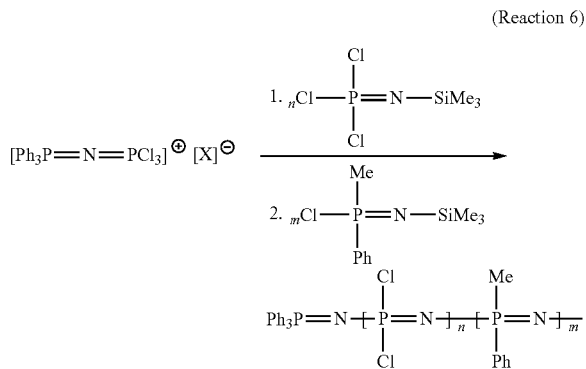

Preparation of block copolymers, graft polymers with organic side-chains, and other advanced architectures, such as polyphosphazenes with a branched polyphosphazene backbone, supramolecular structures from polyphosphazenes, helical structures with polyphosphazenes, cyclomatrix polyphosphazenes, and dendrimers from hexachlorocyclotriphosphazene, can also be achieved.

A desirable group of polymerizable or curable phosphazene derivative or compound is of the general formula: [—NP(A)a(B)b-]$_x$ (Chemical formula 5), wherein the groups A and B are bonded to phosphorous atoms through —O—, —S—, —NH—, or —NR—, wherein R is a C$_1$-C$_6$ alkyl group; A contains at least one of a vinyl ether group of the general formula Q-O—CR'=CHR" and a styrene ether group of the general formula:

wherein at least one of R' and R" are hydrogen or a C$_1$-C$_{10}$ alkyl group; B is a reactive or nonreactive hydrocarbon group optionally containing at least one of O, S, and N, and optionally containing at least one reactive group; Q is one of an aliphatic, cycloaliphatic, aromatic, and heterocyclic hydrocarbon group optionally containing at least one of O, S, and N; a is a number greater than 0; b is 0 or a number greater than 0; a+b=2, x stands for a whole number that is at least 2; and z stands for 0 or 1.

Further desirably, A is of the general formula:

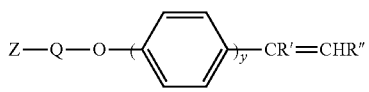

and B=Z'—YH, so that the phosphazene derivative is of the general formula:

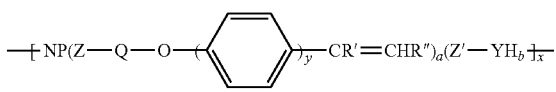

wherein Z and Z' are the same or different and each e stands for —O—, —S—, —NH—, or —NR— wherein R is a C$_1$-C$_6$ alkyl; Q is at least one of an aliphatic, cycloaliphatic, aromatic, and heterocyclic hydrocarbon group optionally containing at least one of O, S, and N; YH stands for at last one of an aliphatic, cycloaliphatic, aromatic, and heterocyclic hydrocarbon group optionally containing at least one of O, S, and N and optionally containing a reactive group different from a vinyl ether group or a styrene ether group; y is 0 or 1; x is a whole number from 2 to 20; and a, b, R' and R" are defined as above.

The presently disclosed phosphazenes (also commonly referred to as phosphazene derivatives or phosphazene compounds) can be cured by a process that is initiated cationically, which bears many advantages. The phosphazene derivatives of the disclosure can contain two or more different vinyl ether groups and/or both vinyl ether groups and styrene ether groups in one molecule. These phosphazene derivatives, which can be polymerized cationically at least when substituted by vinyl ether groups, and polymerization of these phosphazenes can be initiated by acids. Phosphite or other cationic initiators may be used. They have one or more of the following advantages: complete substitution of the phosphazene and thus absence of chlorine can be achieved in high yields; oxygen does not inhibit the curing of the presently disclosed phosphazene derivatives; they are normally less viscous and therefore more suitable for injection into dry battery cells.

In some preferred embodiments, in the polymerizable phosphazene derivatives designated as [—NP(A)a(B)b-]$_x$ (Chemical formula 5), A and B are identical to or different from each other and independently represent a polymerization curable group containing an acryl group, a methacryl group, a vinyl group or an allyl group or a non-polymerization curable group, including a hydrogen atom, a halogen atom, a phenoxy group, a halogenated phenoxy group, an alkoxy group, a halogenated alkoxy group, an amino group, an alkylamino group, a halogenated alkylamino group or a mercapto group, provided however that at least one of A and B is a polymerization curable group; a and b are independently each 0 or an integer larger than 0, provided however that the sum of a and b is 2; and n is an integer of 3 or larger.

In this general formula [—NP(A)a(B)b-]$_x$, the polymerization curable group referred to by the reference symbol A and B is not restricted to any particular group as long as the group is provided with an unsaturated linkage polymerizable with heating or upon exposure to ultraviolet light, electron beam, or other forms of high-energy radiation and includes a group containing an acryl group, a methacryl group, a vinyl group or an allyl group. Preferred are an acryloyloxy group and a methacryloyloxy group from the viewpoint of the curing rate.

In this general formula, the non-polymerization curable group referred to by the reference symbol A and B can include a hydrogen atom, a halogen atom, a phenoxy group, a halogenated phenoxy group, an alkoxy group, a halogenated alkoxy group, an amino group, an alkylamino group, a halogenated alkylamino group or a mercapto group.

In order to improve the flame retardancy, there may be introduced, as a non-polymerization group, a fluorine-containing group as represented by the following general formula: —OCH$_2$(CF$_2$)$_m$Z$^1$, wherein m is an integer from 1 to 4; and Z$^1$ is a hydrogen atom or a fluorine atom, or as represented by the following general formula: —OCH(CF$_3$)$_2$.

A fluoride capable of introducing the fluorine-containing group may include, for example, 2,2,2-trifluoroethanol, 2,2, 3,3,3-pentafluoro-1-propanol, 2,2,3,3,4,4,4-heptafluoro-1-butanol, 2,2,3,3-tetrafluoro-1-propanol, 2,2,3,3,4,4,5,5-octafluoro-1-pentanol, and 1,1,1,3,3,3-hexafluoro-2-propanol.

In accordance with certain embodiments of the present disclosure, the group represented by the reference symbols A and/or B in the general formula above is preferably a group as represented by the following Chemical formula 6:

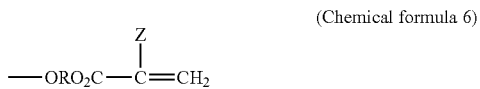

(Chemical formula 6)

wherein R is an alkylene group having from 1 to 12 carbon atoms; and Z is a hydrogen atom or a methyl group. In the general formula, the alkylene group referred to by the reference symbol R may include a linear or branched alkylene group, and an ethylene group is a preferred alkylene group.

Representative examples of the groups represented by the Chemical formula (6) above may include, for example, a residue (hereinafter referred to sometimes as a methacrylate residue) obtainable by removing a hydrogen atom from the hydroxy group of a methacrylate, such as 2-hydroxyethyl methacrylate, 2-hydroxypropyl methacrylate, 2-hydroxybutyl methacrylate, 3-hydroxybutyl methacrylate, 4-hydroxybutyl methacrylate, 5-hydroxypentyl methacrylate, 6-hydroxy-3-methylhexyl methacrylate, 5-hydroxyhexyl methacrylate, 3-hydroxy-2-t-butylpropyl methacrylate, 3-hydroxy-2,2-dimethylhexyl methacrylate, 3-hydroxy-2-methylethylpropyl methacrylate and 12-hydroxydodecyl methacrylate; and a residue (hereinafter referred to sometimes as an acrylate residue) obtainable by removing a hydrogen atom from the hydroxy group of an acrylate, such as 2-hydroxyethyl acrylate, 2-hydroxypropyl acrylate, 2-hydroxybutyl acrylate, 3-hydroxybutyl acrylate, 4-hydroxybutyl acrylate, 5-hydroxypentyl acrylate, 6-hydroxy-3-methylhexyl acrylate, 5-hydroxyhexyl acrylate, 3-hydroxy-2-t-butylpropyl acrylate, 3-hydroxy-2,2-dimethylhexyl acrylate, 3-hydroxy-2-methylethylpropyl acrylate and 12-hydroxydodecyl acrylate. Preferred are the 2-hydroxylethyl methacrylate residue and 2-hydroxylethyl acrylate residue.

As a result of comparison of a hydroxylalkyl methacrylate residue with a hydroxylalkyl acrylate residue, the hydroxylalkyl acrylate residue is more preferred in terms of the curing rate. The curable phosphazene compounds as represented by the Chemical formula (5) above may be one in which the reference symbol n is an integer of 3 or greater, preferably from 3 to 18, and, more preferably, a cyclic compound in which n is 3 or 4 or a mixture thereof.

The curable phosphazene compounds may be prepared by known processes. For instance, a reaction of hexachlorocyclotriphosphazene with 2-hydroxylethyl methacrylate yields a phosphazene compound in which a portion or all of the chlorine atoms of the hexachlorocyclotriphosphazene is substituted by the 2-hydroxylethyl methacrylate residue. In this case, it is preferred that all the chlorine atoms are substituted although it is possible that a portion of the chlorine atoms is left unsubstituted. In this reaction, it is advantageous to use a tertiary amine because it can facilitate the reaction of removing hydrogen chloride. Such a tertiary amine may include, for example, trimethyl amine, triethyl amine, triisopropyl amine, tri-n-propyl amine, tri-n-butyl amine and pyridine. Most preferred is pyridine.

The reaction may be carried out usually in an organic solvent which may include, for example, benzene, toluene, xylene, chloroform, cyclohexane, methylene chloride or tetrahydrofuran or a mixture thereof.

The chlorophosphazene compound to be used as a starting material for the preparation of the phosphazene compound may preferably include a trimer of dichlorophosphazene, i.e., hexachlorocyclotriphosphazene, teromer thereof, i.e., octachlorocyclotetraphosphazene, or an oligomer thereof, because the phosphazene compound obtained by using the trimer, teromer or oligomer thereof can readily control the cross-linkage density in the final electrolyte product (obtainable by curing the phosphazene compound).

The curable resin composition for encapsulation according to some embodiments of the present disclosure contains the pentaerythritol acrylate compound and/or the bis(4-acryloxydialkoxyphenyl)alkane compound, on top of the curable phosphazene compound as have been described hereinabove. Examples of the pentaerythritol acrylate compounds include pentaerythritol triacrylate, dipentaerythritol hexaacrylate or dipentaerythritol monohydroxypentaacrylate. Among these compounds, pentaerythritol triacrylate, dipentaerythritol hexaacrylate, and dipentaerythritol monohydroxypentaacrylate are preferred. The pentaerythritol acrylate compound may be used singly or in combination thereof. Preferably, the pentaerythritol acrylate compound is a mixture of dipentaerythritol hexaacrylate with dipentaerythritol monohydroxypenataacrylate.

The pentaerythritol acrylate compound may be obtained, for example, by reacting pentaerithritol with acrylic acid. Furthermore, among these pentaerythritol acrylate compounds, it is preferred to use a mixture of the dipentaerythritol hexaacrylate containing 0.3 to 0.5 in mole of dipentaerythritol monohydroxypentaacrylate that is readily available, in terms of curability.

The curing agent may be preferably from, for example, a photopolymerization initiator such as 1-hydroxycyclohexylphenyl ketone, dibenzoyl, benzoyl methyl ether, benzoyl ethyl ether, p-chlorobenzophenone, p-methoxybenzophenone, benzoyl peroxide, di-tert.-butyl peroxide and camphaquinone. These curing agents may be used singly or in combination thereof. They may be used in an amount ranging usually from 0.05 parts to 10.0 parts by weight with respect to 100 parts by weight of the curable resin composition.

When the curable resin composition is cured by heating at elevated temperatures or cured at ambient temperatures, it is preferred to use a peroxide compound, an amine compound or a mixture thereof as a polymerization initiator. Representative examples of the peroxide compounds include benzoyl peroxide, P-chlorobenzoyl peroxide, 2,4-dichlorobenzoyl peroxide, t-butyl hydroperoxide, di-t-butyl peroxide, dicumyl peroxide, t-butyl peroxyacetate, diacetate or t-butyl peroxybenzoate. As representative examples of the amine compounds may be enumerated, for example, N,N-diethanol-p-toluidine, dimethyl-p-toluidine, p-toluidine, methyl amine, t-butyl amine, methylethyl amine, diphenyl amine, 4,4'-dinitrodiphenyl amine, o-nitroaniline, p-bromoaniline or 2,4,6-tribromoaniline. They may be used singly or in combination thereof and in an amount ranging usually from 0.05 parts to 10.0 parts by weight, preferably from 0.1 to 6.0 parts by weight, with respect to 100 parts by weight of the curable resin composition.

High-elasticity polymer refers to a polymer, typically a lightly cross-linked polymer, which exhibits an elastic deformation that is at least 5% when measured (without an additive or reinforcement in the polymer) under uniaxial tension. In the field of materials science and engineering, the "elastic deformation" is defined as a deformation of a material (when being mechanically stressed) that is essentially fully recoverable and the recovery is essentially instantaneous upon release of the load. The elastic deformation is preferably greater than 30%, more preferably greater than 50%, further more preferably greater than 100%, still more preferably greater than 150%, and most preferably greater than 200%.

Figure 4A:
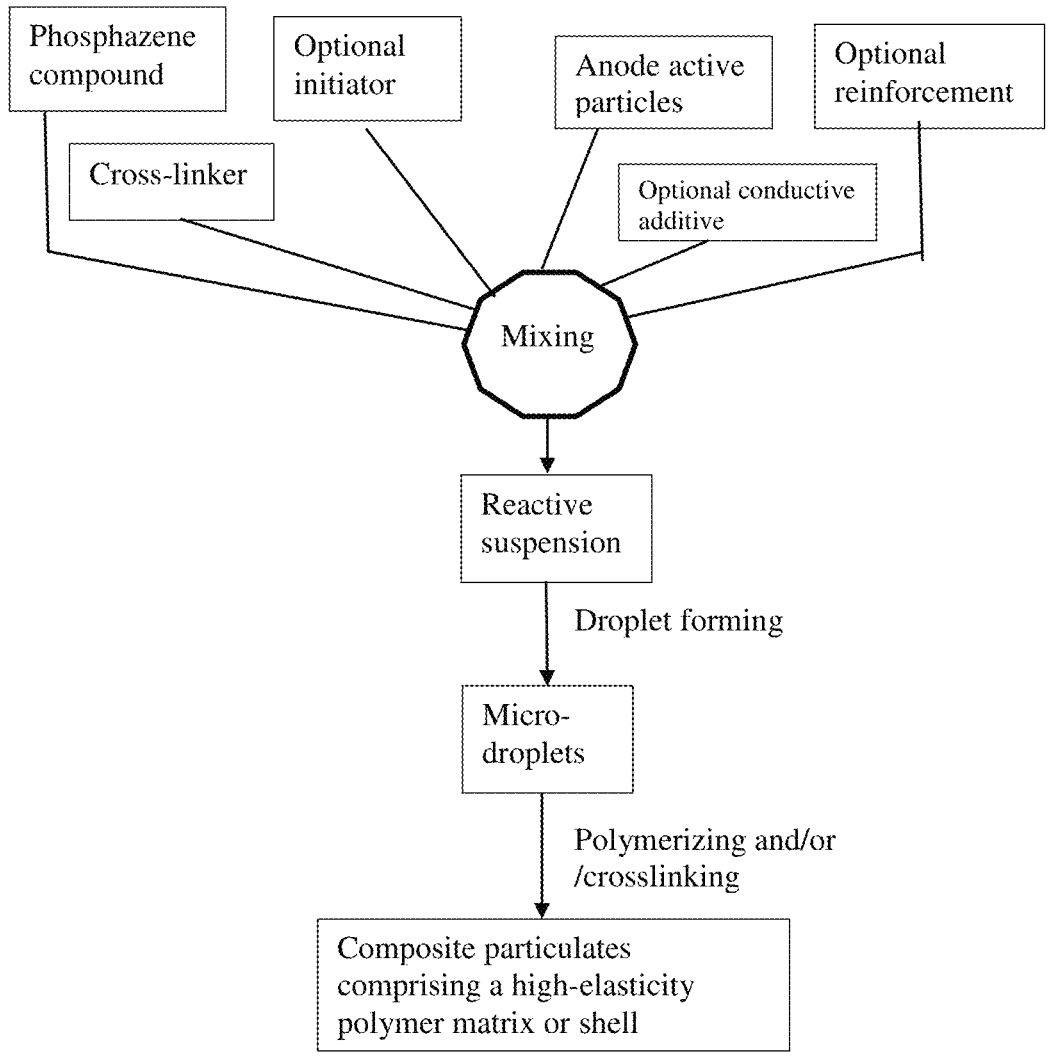
FIG. 4(A) A flow chart illustrating a method of producing the multi-functional composite particulates according to certain embodiments of the present disclosure.
Figure 4B:
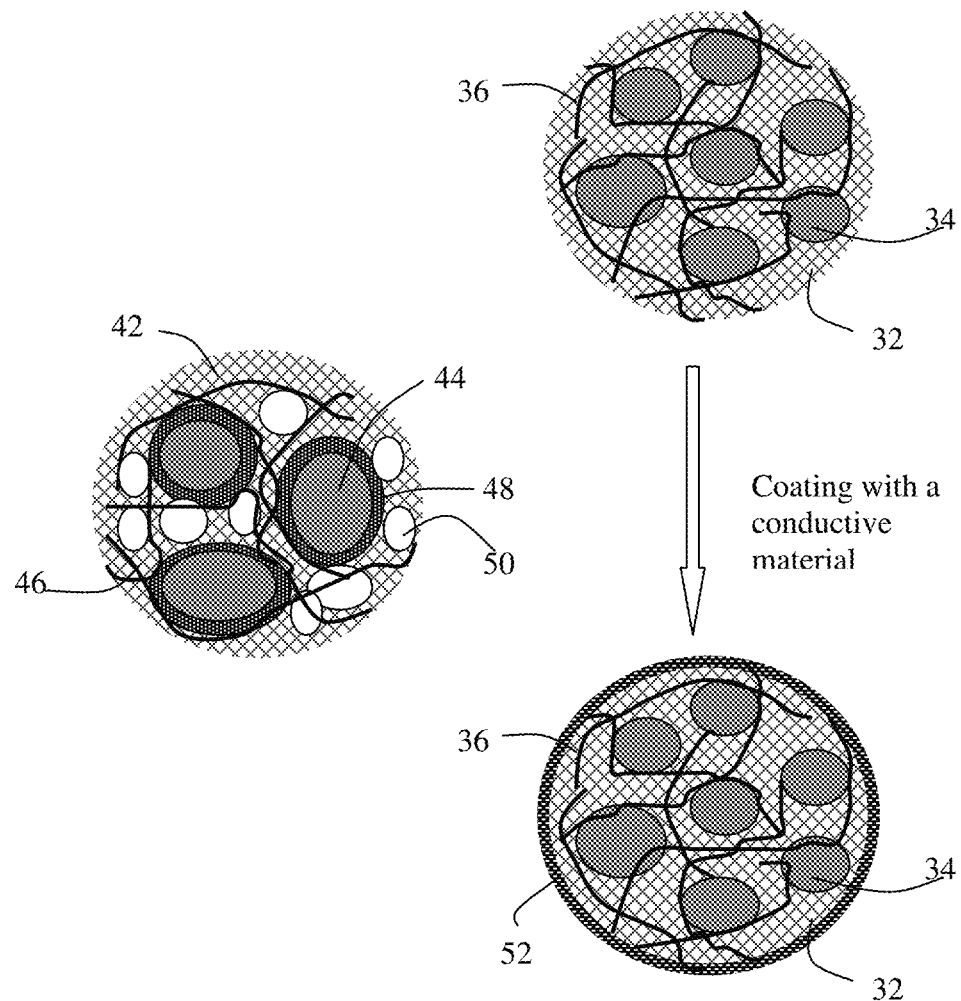
FIG. 4(B) Schematic of three types of composite particulates according to certain embodiments of the present disclosure.

Three examples of the disclosed composite particulates are illustrated in FIG. 4(B). The first one comprises multiple anode active material primary particles 34 (e.g. Si nano particles) and a 3D network of electron-conducting pathways 36 (constituted by CNTs, graphene sheets, CNFs, expanded graphite flakes, etc.) that are dispersed in a high-elasticity polymer matrix 32. The second particulate comprises multiple anode active material particles 44 (e.g., Si nano particles) that are coated by a shell 48 of a conducting material. The composite particulate also comprises pores 50 and a 3D network of electron-conducting pathways 46 (constituted by CNTs, graphene sheets, CNFs, expanded graphite flakes, etc.) that are dispersed in a high-elasticity polymer matrix 42. The third particulate is similar to the first one, but further comprises a conductive protection shell or coating 52 (carbon, graphene, conducting polymer, etc.) deposited on the particulate surface. These anode active material particles can be pre-lithiated or non-prelithiated.

Figure 4C:
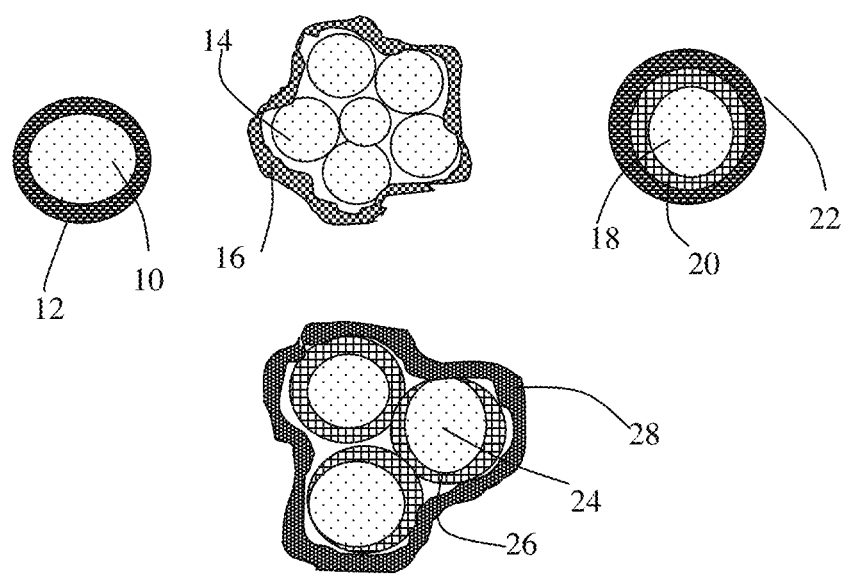
FIG. 4(C) Schematic of four types of composite particulates comprising high-elasticity polymer-encapsulated anode particles according to certain embodiments of the present disclosure FIG. 5(A) Charge/discharge curves of a lithium-ion cell having an anode of unprotected Si micro particles (the first-cycle Coulomb efficiency is from 55.1% to 58.6%)

As illustrated in FIG. 4(C), the present disclosure provides four major types of particulates of elastic polymer-encapsulated anode active material particles. The first one is a single-particle particulate containing an anode active material core 10 encapsulated by a high-elasticity polymer shell 12. The second is a multiple-particle particulate containing multiple anode active material particles 14 (e.g., Si nano particles), optionally along with other active materials (e.g. particles of graphite or hard carbon, not shown) or conductive additive, which are encapsulated by a high-elasticity polymer shell 16. The third is a single-particle particulate containing an anode active material core 18 coated by a carbon layer 20 (or other conductive material) further encapsulated by a high-elasticity polymer shell 22. The fourth is a multiple-particle particulate containing multiple anode active material particles 24 (e.g., Si nano particles) coated with a conductive protection layer 26, optionally along with other active materials (e.g., particles of graphite or hard carbon, not shown) or conductive additive, which are encapsulated by a high-elasticity polymer shell 28. These anode active material particles can be pre-lithiated or non-prelithiated.

Figure 3:
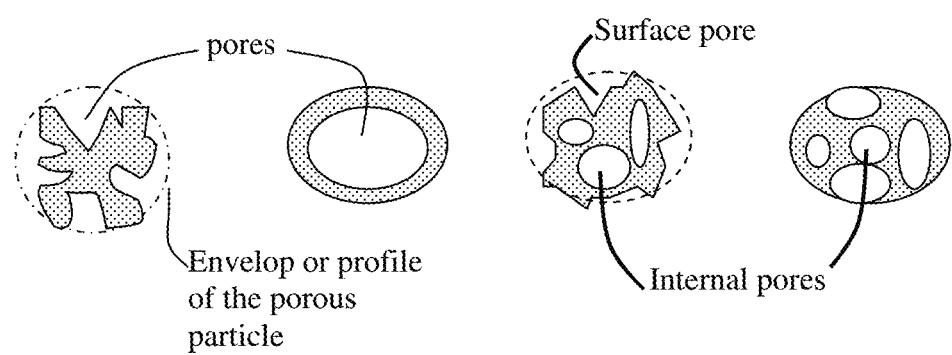
FIG. 3 Schematic of some examples of porous primary particles.

The primary particles themselves may be porous having porosity in the form of surface pores and/or internal pores. FIG. 3 shows some examples of porous primary particles of an anode active material. These pores of the primary particles allow the particle to expand into the free space without a significant overall volume increase of the particulate and without inducing any significant volume expansion of the entire anode electrode.

This amount of pore volume inside the particulate (surface or internal pores of porous primary anode particles) provides empty space to accommodate the volume expansion of the anode active material so that the polymer matrix and the entire composite particulate would not have to significantly expand (not to exceed 50% volume expansion of the particulate) when the lithium battery is charged. Preferably, the composite particulate does not increase its volume by more than 20%, further preferably less than 10% and most preferably by approximately 0% when the lithium battery is charged. Such a constrained volume expansion of the particulate would not only reduce or eliminate the volume expansion of the anode electrode but also reduce or eliminate the issue of repeated formation and destruction of a solid-electrolyte interface (SEI) phase. We have discovered that this strategy surprisingly results in significantly reduced battery capacity decay rate and dramatically increased charge/discharge cycle numbers. These results are unexpected and highly significant with great utility value.

Multiple non-lithiated Si particles can be dispersed in or encapsulated by a high-elasticity polymer to form a composite particulate. As the lithium-ion battery is charged, the anode active material particles (e.g. Si) are intercalated with lithium ions and, hence, the Si particle expands. Due to the high elasticity of the polymer, the polymer may simply expand accordingly without breaking up into pieces. That the high-elasticity polymer remains intact prevents the exposure of the embedded Si particles to liquid electrolyte and, thus, prevents the Si from undergoing undesirable reactions with electrolyte during repeated charges/discharges of the battery. This strategy prevents continued consumption of the electrolyte and lithium ions to form additional SEI.

The particulate may further contain a graphite, graphene, and/or carbon material dispersed in the high-elasticity polymer matrix. The carbon or graphite material may be selected from polymeric carbon, amorphous carbon, chemical vapor deposition carbon, coal tar pitch, petroleum pitch, mesophase pitch, carbon black, coke, acetylene black, activated carbon, fine expanded graphite particle with a dimension smaller than 100 nm, artificial graphite particle, natural graphite particle, carbon nano-tubes (single-walled or multi-walled), carbon nano-fibers (vapor-grown or carbonized polymer fibers), graphitic nano-fibers, graphene sheets, or a combination thereof. Graphene may be selected from pristine graphene, graphene oxide, reduced graphene oxide, graphene fluoride, hydrogenated graphene, nitrogenated graphene, functionalized graphene, etc.

The carbon/graphite/graphene particles, fibers, nanotubes, and/or nano sheets dispersed in the high-elasticity polymer or encapsulated in the high-elasticity polymer shell preferably and typically constitute a 3D network of electron-conducting paths that preferably are in contact with individual primary particles of the anode active material. The high-elasticity polymer matrix, being a continuous phase and making contact with individual primary particles (being substantially totally immersed in the polymer matrix) provide a 3D network of lithium ion-conducting paths. In other words, there are dual networks of conducting pathways for electrons and lithium ions inside the multi-functional composite particulate.

The anode active material may be selected from the group consisting of: (a) silicon (Si), germanium (Ge), tin (Sn), lead (Pb), antimony (Sb), phosphorus (P), bismuth (Bi), zinc (Zn), aluminum (Al), titanium (Ti), nickel (Ni), cobalt (Co), and cadmium (Cd); (b) alloys or intermetallic compounds of Si, Ge, Sn, Pb, Sb, Bi, Zn, Al, Ti, Ni, Co, or Cd with other elements; (c) oxides, carbides, nitrides, sulfides, phosphides, selenides, and tellurides of Si, Ge, Sn, Pb, Sb, Bi, Zn, Al, Ti, Fe, Ni, Co, V, or Cd, and their mixtures, composites, or lithium-containing composites; (d) salts and hydroxides of Sn; (e) lithium titanate, lithium manganate, lithium aluminate, lithium titanium niobium oxide, lithium-containing titanium oxide, lithium transition metal oxide, $ZnCo_2O_4$; (f) carbon or graphite particles (g) prelithiated versions thereof; and (h) combinations thereof.

Pre-lithiation of an anode active material can be conducted by several methods (chemical intercalation, ion implementation, and electrochemical intercalation). Among these, the electrochemical intercalation is the most effective. Lithium ions can be intercalated into non-Li elements (e.g. Si, Ge, and Sn) and compounds (e.g. $SnO_2$ and $Co_3O_4$) up to a weight percentage of 54.68% (see Table 1 below). For Zn, Mg, Ag, and Au encapsulated inside an elastomer shell, the amount of Li can reach 99% by weight.

TABLE 1

Lithium storage capacity of selected non-Li elements.

| Intercalated compound | Atomic weight of Li, g/mole | Atomic weight of active material, g/mole | Max. wt. % of Li |
|---|---|---|---|
| $Li_4Si$ | 6.941 | 28.086 | 49.71 |
| $Li_{4.4}Si$ | 6.941 | 28.086 | 54.68 |
| $Li_{4.4}Ge$ | 6.941 | 72.61 | 30.43 |
| $Li4.4Sn$ | 6.941 | 118.71 | 20.85 |
| $Li_3Cd$ | 6.941 | 112.411 | 14.86 |
| $Li_3Sb$ | 6.941 | 121.76 | 13.93 |
| $Li_{4.4}Pb$ | 6.941 | 207.2 | 13.00 |
| LiZn | 6.941 | 65.39 | 7.45 |
| $Li_3Bi$ | 6.941 | 208.98 | 8.80 |

The particles of the anode active material may be in the form of a nano particle, nano wire, nano fiber, nano tube, nano sheet, nano platelet, nano disc, nano belt, nano ribbon, or nano horn. They can be non-lithiated (when incorporated into the anode active material layer) or pre-lithiated to a desired extent (up to the maximum capacity as allowed for a specific element or compound.

Preferably and typically, the high-elasticity polymer has a lithium ion conductivity no less than $10^{-5}$ S/cm, more preferably no less than $10^{-4}$ S/cm, further preferably no less than $10^{-3}$ S/cm, and most preferably no less than $10^{-2}$ S/cm. In some embodiments, the high-elasticity polymer is a neat polymer having no additive or filler dispersed therein. In others, the high-elasticity polymer is a polymer matrix composite containing from 0.1% to 50% (preferably 1% to 35%) by weight of a lithium ion-conducting additive dispersed in the high-elasticity polymer matrix material. The high-elasticity polymer preferably has a high elasticity (elastic deformation strain value >5%).

An elastic deformation is a deformation that is fully recoverable and the recovery process is essentially instantaneous (no significant time delay) upon release of the mechanical stress. The high-elasticity polymer can exhibit an elastic deformation from 5% up to 1,000% (10 times of its original length), more typically from 10% to 800%, and further more typically from 50% to 500%, and most typically and desirably from 70% to 300%.

It may be noted that although a metal typically has a high ductility (i.e. can be extended to a large extent without breakage), the majority of the deformation is plastic deformation (non-recoverable) and only a small amount of elastic deformation (typically <1% and more typically <0.2%).

Typically, a high-elasticity polymer is originally in a monomer, oligomer, or linear or branched chain states that can be cured to form a cross-linked polymer that is highly elastic. Prior to curing, these polymers or oligomers are soluble in an organic solvent or, preferably, water to form a polymer solution. Particles of an anode active material (e.g. $SnO_2$ nano particles and Si nano-wires) can be dispersed in this polymer solution to form a suspension (dispersion or slurry) of an active material particle-polymer (monomer or oligomer) mixture. This suspension can then be subjected to a solvent removal treatment. The polymer (or monomer or oligomer) precipitates out to form a continuous phase or matrix in which the active material primary particles are dispersed (if a polymer content is high), or to form a coating encapsulating the anode particles (if a polymer content is low). This can be accomplished, for instance, via solution dipping, coating or casting on a solid substrate surface, spray drying, ultrasonic spraying, air-assisted spraying, aerosolization, and other secondary particle formation procedures.

It is essential for these materials to form a lightly cross-linked network of polymer chains. In other words, the network polymer or cross-linked polymer should have a relatively low degree of cross-linking or low cross-link density to impart a high elastic deformation.

The cross-link density of a cross-linked network of polymer chains may be defined as the inverse of the molecular weight between cross-links (Mc). The cross-link density can be determined by the equation, Mc=ρRT/Ge, where Ge is the equilibrium modulus as determined by a temperature sweep in dynamic mechanical analysis, p is the physical density, R is the universal gas constant in J/mol*K and T is absolute temperature in K. Once Ge and p are determined experimentally, then Mc and the cross-link density can be calculated.

The magnitude of Mc may be normalized by dividing the Me value by the molecular weight of the characteristic repeat unit in the cross-link chain or chain linkage to obtain a number, Nc, which is the number of repeating units between two cross-link points. We have found that the elastic deformation strain correlates very well with Mc and Nc. The elasticity of a cross-linked polymer derives from a large number of repeating units (large Nc) between cross-links. The repeating units can assume a more relax conformation (e.g. random coil) when the polymer is not stressed. However, when the polymer is mechanically stressed, the linkage chain uncoils or gets stretched to provide a large deformation. A long chain linkage between cross-link points (larger Nc) enables a larger elastic deformation. Upon release of the load, the linkage chain returns to the more relaxed or coiled state. During mechanical loading of a polymer, the cross-links prevent slippage of chains that otherwise form plastic deformation (non-recoverable).

Preferably, the Nc value in a high-elasticity polymer is greater than 5, more preferably greater than 10, further more preferably greater than 100, and even more preferably greater than 200. These Nc values can be readily controlled and varied to achieve different elastic deformation values by using different cross-linking agents with different functionalities, and by designing the polymerization and cross-linking reactions to proceed at different temperatures for different periods of time.

Alternatively, Mooney-Rilvin method may be used to determine the degree of cross-linking. Crosslinking also can be measured by swelling experiments. In a swelling experiment, the crosslinked sample is placed into a good solvent for the corresponding linear polymer at a specific temperature, and either the change in mass or the change in volume is measured. The higher the degree of crosslinking, the less swelling is attainable. Based on the degree of swelling, the Flory Interaction Parameter (which relates the solvent interaction with the sample, Flory Huggins Eq.), and the density of the solvent, the theoretical degree of crosslinking can be calculated according to Flory's Network Theory. The Flory-Rehner Equation can be useful in the determination of cross-linking.

The high-elasticity polymer matrix may contain a simultaneous interpenetrating network (SIPN) polymer, wherein two cross-linking chains intertwine with each other, or a semi-interpenetrating network polymer (semi-IPN), which contains a cross-linked polymer and a linear polymer.

The aforementioned high-elasticity polymers may be used alone to serve as a matrix. Alternatively, the high-elasticity polymer can be mixed with a broad array of elastomers, electrically conducting polymers, lithium ion-conducting materials, and/or strengthening materials (e.g. carbon nanotube, carbon nano-fiber, or graphene sheets).

A broad array of elastomers can be mixed with a high-elasticity polymer. Substantially all the anode primary particles in a particulate are fully embedded in and surrounded by the polymer, preventing direct contact between the particle(s) and the liquid electrolyte in the battery.

The high-elasticity polymer may further contain an elastomeric material selected from natural polyisoprene (e.g. cis-1,4-polyisoprene natural rubber (NR) and trans-1,4-polyisoprene gutta-percha), synthetic polyisoprene (IR for isoprene rubber), polybutadiene (BR for butadiene rubber), chloroprene rubber (CR), polychloroprene (e.g. Neoprene, Baypren etc.), butyl rubber (copolymer of isobutylene and isoprene, IIR), including halogenated butyl rubbers (chloro butyl rubber (CIIR) and bromo butyl rubber (BIIR), styrene-butadiene rubber (copolymer of styrene and butadiene, SBR), nitrile rubber (copolymer of butadiene and acrylonitrile, NBR), EPM (ethylene propylene rubber, a copolymer of ethylene and propylene), EPDM rubber (ethylene propylene diene rubber, a terpolymer of ethylene, propylene and a diene-component), epichlorohydrin rubber (ECO), polyacrylic rubber (ACM, ABR), silicone rubber (SI, Q, VMQ), fluorosilicone rubber (FVMQ), fluoroelastomers (FKM, and FEPM; such as Viton, Tecnoflon, Fluorel, Aflas and Dai-El), perfluoroelastomers (FFKM: Tecnoflon PFR, Kalrez, Chemraz, Perlast), polyether block amides (PEBA), chlorosulfonated polyethylene (CSM; e.g. Hypalon), and ethylene-vinyl acetate (EVA), thermoplastic elastomers (TPE), protein resilin, protein elastin, ethylene oxide-epichlorohydrin copolymer, polyurethane, urethane-urea copolymer, and combinations thereof.

The urethane-urea copolymer usually consists of two types of domains, soft domains and hard ones. Entangled linear backbone chains consisting of poly(tetramethylene ether) glycol (PTMEG) units constitute the soft domains, while repeated methylene diphenyl diisocyanate (MDI) and ethylene diamine (EDA) units constitute the hard domains. The lithium ion-conducting additive can be incorporated in the soft domains or other more amorphous zones.

In some embodiments, a high-elasticity polymer can form a polymer matrix composite containing a lithium ion-conducting additive dispersed in the high-elasticity polymer matrix material, wherein the lithium ion-conducting additive is selected from $Li_2CO_3$, $Li_2O$, $Li_2C_2O_4$, LiOH, LiX, $ROCO_2Li$, HCOLi, ROLi, $(ROCO_2Li)_2$, $(CH_2OCO_2Li)_2$, $Li_2S$, $Li_xSO_y$, or a combination thereof, wherein X=F, Cl, I, or Br, R=a hydrocarbon group, $0<x\le1$, $1\le y\le4$.

In some embodiments, the high-elasticity polymer can be mixed with a lithium ion-conducting additive, which contains a lithium salt selected from lithium perchlorate (LiClO$_4$), lithium hexafluorophosphate (LiPF$_6$), lithium borofluoride (LiBF$_4$), lithium hexafluoroarsenide (LiAsF$_6$), lithium trifluoro-methanesulfonate (LiCF$_3$SO$_3$), bis-trifluoromethyl sulfonylimide lithium (LiN(CF$_3$SO$_2$)$_2$), lithium bis(oxalato)borate (LiBOB), lithium oxalyldifluoroborate (LiBF$_2$C$_2$O$_4$), lithium nitrate (LiNO$_3$), Li-fluoroalkyl-phosphate (LiPF$_3$(CF$_2$CF$_3$)$_3$), lithium bisperfluoro-ethylsulfonylimide (LiBETI), lithium bis(trifluoromethanesulfonyl)imide, lithium bis(fluorosulfonyl)imide, lithium trifluoromethanesulfonimide (LiTFSI), an ionic liquid-based lithium salt, or a combination thereof.

The high-elasticity polymer may form a mixture or blend with an electron-conducting polymer selected from polyaniline, polypyrrole, polythiophene, polyfuran, a bi-cyclic polymer, derivatives thereof (e.g. sulfonated versions), or a combination thereof.

In some embodiments, the high-elasticity polymer may form a mixture with a lithium ion-conducting polymer selected from poly(ethylene oxide) (PEO), Polypropylene oxide (PPO), poly(acrylonitrile) (PAN), poly(methyl methacrylate) (PMMA), poly(vinylidene fluoride) (PVdF), Poly bis-methoxy ethoxyethoxide-phosphazene, Polyvinyl chloride, Polydimethylsiloxane, poly(vinylidene fluoride)-hexafluoropropylene (PVDF-HFP), a derivative thereof (e.g. sulfonated versions), or a combination thereof.

The present disclosure also provides a method of producing composite particulates comprising anode active material particles dispersed in a high-elasticity polymer. As schematically illustrated in FIG. 4(A), the method comprises mixing reactants (phosphazene monomer, initiator, and curing or crosslinking agent) or at least a reactive phosphazene polymer, primary particles of an anode active material, optional reinforcement material, and optional lithium ion-conducting additive to form a reactive slurry. One may mix these ingredients sequentially or concurrently. For instance, one may mix all of these ingredients to form the reactive slurry in one pot (one container) all at once and then rapidly form the reactive slurry into micro-droplets, allowing the reactants to react with one another for polymerizing and crosslinking to form the networks of crosslinked polymer chains. The anode active material particles are dispersed in the polymer or encapsulated by the polymer or encapsulated by the polymer.

Alternatively, one may first mix certain ingredient(s) in one pot and other ingredients in other pot(s) and then combine them together in one pot. For instance, one may mix the monomer and the initiator in one pot, allowing the mixture to proceed to form a reactive oligomer (low molecular weight chains). A separate pot may be used to contain the curing agent (crosslinker). The primary particles of anode active material and other ingredients may be dispersed into either pot or both pots. The ingredients in two pots are then combined together and then heated or radiation-exposed to initiate the polymerization and crosslinking reactions (if appropriate).

The present disclosure also provides a method of manufacturing the composite particulates described above, the method comprising: (a) dispersing multiple particles of an anode active material in a precursor polymer solution to form a suspension wherein these particles are fully embedded or immersed in said precursor solution, which comprises at least a curing agent dissolved or dispersed in a reactive liquid medium that comprises a reactive phosphazene compound, in a form of monomer, oligomer or reactive polymer, and an optional non-aqueous liquid solvent; (b) operating a secondary particle-forming procedure to shape the suspension into multiple droplets and remove the liquid solvent from the droplets; and (c) curing the reactive phosphazene compound to form the composite particulates wherein a particulate comprises one or a plurality of anode active material particles that are dispersed and embedded in a polymer matrix or encapsulated by a polymer shell.

Several composite droplet forming processes require the high-elasticity polymer or its precursor (monomer or oligomer) to be dissolvable in a solvent. Fortunately, all the high-elasticity polymers or their precursors used herein are either in a liquid state at room temperature or are soluble in some common solvents. The un-cured polymer or its precursor can be readily dissolved in a common organic solvent or water to form a solution. This solution can then be used to embed, immerse, engulf or encapsulate the solid particles (anode particles along with other additive or reinforcement materials) via several of the micro-droplet-forming methods to be discussed in what follows. Upon formation of the droplets, the polymer matrix is then polymerized and cross-linked.

There are three broad categories of micro-encapsulation methods that can be implemented to produce high-elasticity polymer composite: physical methods, physico-chemical methods, and chemical methods. The physical methods include extrusion and pelletizing, solution dipping and drying, suspension coating or casting on a solid substrate (e.g. slot-die coating, Comma coating, spray-coating) followed by drying and scratching off particles from the substrate, pan-coating, air-suspension coating, centrifugal extrusion, vibration nozzle, and spray-drying methods. The physico-chemical methods include ionotropic gelation and coacervation-phase separation methods. The chemical methods include interfacial polycondensation, interfacial cross-linking, in-situ polymerization, and matrix polymerization.

It may be noted that some of these methods (e.g. pan-coating, air-suspension coating, and spray-drying) may be used to coat or encapsulate primary particles or particulates (secondary particles) by adjusting the solid content, degree of dispersion, spraying and drying conditions, etc. Similar processes may be used to produce composite particulates wherein the particles are fully dispersed in a polymer matrix, not just coating on some surfaces. This can be accomplished by providing a higher amount of the reacting monomer, oligomer, or polymer with respect to the anode particles, for instance.

Pan-coating method: The pan coating process involves tumbling the anode active material primary particles (along with any desired additive or reinforcement materials) in a pan or a similar device while the matrix material (e.g., monomer/oligomer liquid or uncured polymer/solvent solution; possibly containing a lithium salt dispersed or dissolved therein) is applied slowly until a desired amount of matrix is attained.

Air-suspension coating method: In the air suspension coating process, the solid primary particles of anode active material are dispersed into the supporting air stream in an embedding chamber. A controlled stream of a reactive precursor solution (e.g., polymer or its monomer or oligomer dissolved in a solvent; or its monomer or oligomer alone in a liquid state) is concurrently introduced into this chamber, allowing the solution to hit and embed the suspended particles. These suspended particles are embedded in the reactive precursor (monomer, oligomer, etc. which is polymerized/cured concurrently or subsequently) while the volatile solvent is removed, leaving behind a composite comprising a matrix of conducting network polymer and anode active material particles. This process may be repeated several times until the required parameters, such as full embedding, are achieved. The air stream which supports the anode particles also helps to dry them, and the rate of drying is directly proportional to the temperature of the air stream, which can be adjusted for optimized polymer network amount.

In a preferred mode, the particles in the embedding zone portion may be subjected to re-circulation for repeated embedding. Preferably, the chamber is arranged such that the particles pass upwards through the embedding zone, then are dispersed into slower moving air and sink back to the base of the encapsulating chamber, enabling repeated passes of the particles through the embedding zone until the desired matrix amount is achieved.

Centrifugal extrusion: Primary anode particles may be embedded in a polymer network or precursor material using a rotating extrusion head containing concentric nozzles. In this process, a stream of core fluid (slurry containing anode particles dispersed in a solvent) is surrounded by a sheath of shell solution or melt containing the polymer or precursor. As the device rotates and the stream moves through the air it breaks, due to Rayleigh instability, into droplets of core, each coated with the shell solution. While the droplets are in flight, the molten shell may be hardened or the solvent may be evaporated from the shell solution. If needed, the capsules can be hardened after formation by catching them in a hardening bath. Since the drops are formed by the breakup of a liquid stream, the process is only suitable for liquid or slurry. A high production rate can be achieved. Up to 22.5 kg of microcapsules can be produced per nozzle per hour and extrusion heads containing 16 nozzles are readily available.

Vibrational nozzle encapsulation method: matrix-encapsulation of anode particles can be conducted using a laminar flow through a nozzle and vibration of the nozzle or the liquid. The vibration has to be done in resonance with the Rayleigh instability, leading to very uniform droplets. The liquid can include any liquids with limited viscosities (1-50,000 mPa·s): emulsions, suspensions or slurry containing the anode active material particles and the polymer or precursor.

Spray-drying: Spray drying may be used to encapsulate and embed anode particles when the particles are suspended in a melt or polymer/precursor solution to form a suspension. In spray drying, the liquid feed (solution or suspension) is atomized to form droplets which, upon contacts with hot gas, allow solvent to get vaporized and a polymer matrix to fully embed the particles.

In-situ polymerization: In some micro-encapsulation processes, anode particles are fully embedded in a monomer or oligomer first. Then, direct polymerization of the monomer or oligomer is carried out with the presence of these material particles dispersed therein.

Matrix polymerization: This method involves dispersing and embedding anode primary particles in a polymeric matrix during formation of the particles. This can be accomplished via spray-drying, in which the particles are formed by evaporation of the solvent from the matrix material. Another possible route is the notion that the solidification of the matrix is caused by a chemical change.

In summary, in certain embodiments, the disclosure provides a method of producing the multi-functional particulates, the method comprising (A) dispersing a plurality of primary particles of an anode active material, having a diameter or thickness from 0.5 nm to 20 m, in a liquid mixture of a monomer or oligomer of a phosphazene compound or derivative, an initiator, and a cross-linking agent to form a reactive slurry; (B) forming the reactive slurry into micro-droplets and polymerizing and curing the monomer or oligomer in the micro-droplets to form the multi-functional particulates. The reactive mixture may further comprise a dopant, a reinforcement material, a lithium ion-conducting additive, an electron-conducting additive, or a combination thereof.

A foaming agent or blowing agent may be introduced into the reactive slurry and can be activated to produce pores in the micro-droplets when the reactive species are polymerized or crosslinked.

In some embodiments, the reactive slurry further comprises a high-strength material selected from carbon nanotubes, carbon nano-fibers, carbon or graphite fibers, graphene sheets, expanded graphite flakes, polymer fibrils, glass fibers, ceramic fibers, metal filaments or metal nanowires, or a combination thereof. Some of these high-strength materials are electron-conducting.

The step (B) of forming micro-droplets may comprise a procedure selected from solution dipping, coating or casting on a solid substrate, pan-coating, air-suspension coating, centrifugal extrusion, vibration-nozzle encapsulation, spray-drying, coacervation-phase separation, interfacial polycondensation or interfacial cross-linking, in-situ polymerization, matrix polymerization, extrusion and palletization, or a combination thereof.

In certain embodiments, the micro-droplets as formed may contain a liquid solvent and the method further comprises a step of removing the solvent.

The following examples serve to provide the best modes of practice for the present disclosure and should not be construed as limiting the scope of the disclosure:

Example 1: Composite Particulates Containing High-Elasticity Polymer-Protected Micron-Scale Si Particles Si particles were encapsulated with a crosslinked polymer network of phosphazene chains from based on the general formula [—NP(A)a(B)b-]$_x$ according to the following procedure:

In a representative procedure, a 1-liter flask equipped with a thermometer, a stirrer, a dropping funnel and a condenser was charged with 58.0 g (0.167 mole) of hexachlorotriphosphazene, 50 ml of toluene and 158 g (2.0 moles) of pyridine, and the mixture was stirred. To the mixture was dropwise added 143 g (1.1 moles) of 2-hydroxyethyl methacrylate (HEMA) through the dropping funnel. The mixture was heated to 60° C. and the reaction was continued for 8 hours with stirring. After precipitated crystalline materials were filtered off, the solvent in the filtrate was distilled off under reduced pressures. The residual solution was dried to a desired level, leaving 136 g (yield: 91%) of a curable phosphazene compound in the form of a solution having a yellow color.

A benzol peroxide initiator (0.5% by weight) and Si nano particles were added to the curable phosphazene compound in toluene to produce a suspension. The polyphophazene-to-Si ratio was varied from 5/100 to 25/100. The resin/Si system was cured at 60° C. overnight in a vacuum oven and the dried powder was subjected to low-intensity ball to reduce the particulate sizes.

On a separate basis, some amount of the reactive solution without Si was cast onto a glass surface to form a wet film, which was thermally dried and then cured under similar conditions to form a film of cross-linked polymer. Several tensile testing specimens were cut from each cross-linked film and tested with a universal testing machine. The representative tensile stress-strain curves indicate that this series of network polymers have an elastic deformation from approximately 25% to 122%.

For electrochemical testing, the working electrodes were prepared by mixing 85 wt. % active material particles (polymer-protected and non-protected particulates of Si, separately), 7 wt. % acetylene black (Super-P), and 8 wt. % polyvinylidene fluoride (PVDF) binder dissolved in N-methyl-2-pyrrolidinoe (NMP) to form a slurry of 5 wt. % total solid content. After coating the slurries on Cu foil, the electrodes were dried at 120° C. in vacuum for 2 h to remove the solvent before pressing. Then, the electrodes were cut into a disk ($\phi$=12 mm) and dried at 100° C. for 24 h in vacuum. Electrochemical measurements were carried out using CR2032 (3V) coin-type cells with lithium metal as the counter/reference electrode, Celgard 2400 membrane as separator, and 1 M LiPF$_6$ electrolyte solution dissolved in a mixture of ethylene carbonate (EC) and diethyl carbonate (DEC) (EC-DEC, 1:1 v/v). The cell assembly was performed in an argon-filled glove-box. The CV measurements were carried out using an-6 electrochemical workstation at a scanning rate of 1 mV/s. The electrochemical performance of the particulates of high-elasticity polymer-encapsulated Si particles and non-protected Si particles were evaluated by galvanostatic charge/discharge cycling at a current density of 50-200 mA/g, using an electrochemical workstation.

Figure 5A:
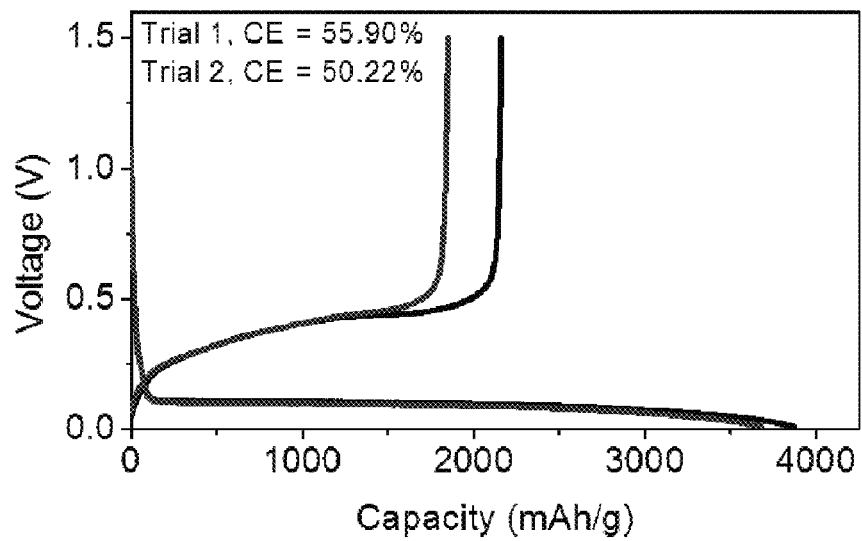
FIG. 5(B) The specific capacity values of a lithium-ion cell having an anode of unprotected Si active material.
FIG. 5(C) Charge/discharge curves of a lithium-ion cell having an anode of high-elasticity polymer matrix-protected Si particles (the first-cycle Coulomb efficiency is from 87.4% to 88.5%)
FIG. 5(D) The specific capacity values of a lithium-ion cell having an anode featuring high-elasticity polymer matrix-protected Si particles.
Figure 5B:
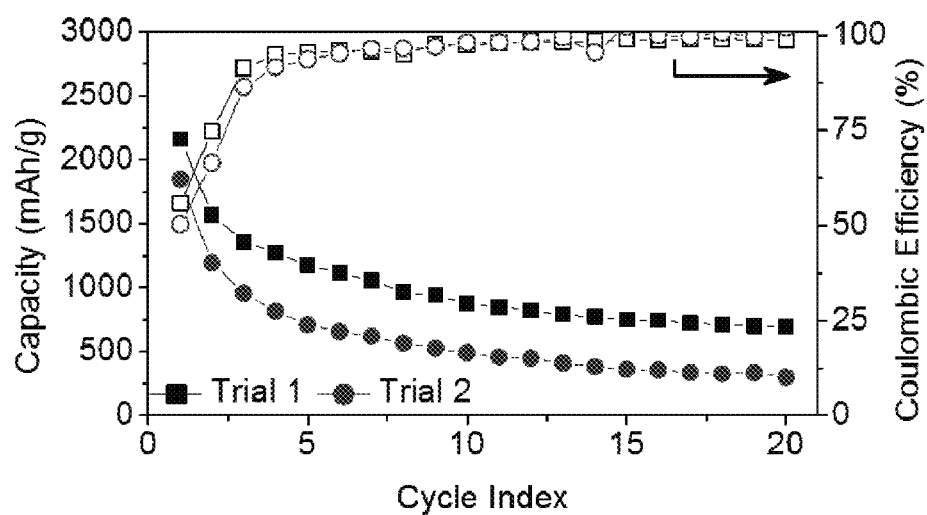

FIG. 5(A) shows the charge/discharge curves of a lithium-ion cell having an anode of unprotected sub-micron Si particles. The first-cycle Coulomb efficiency of this cell is only from 50.2% to 55.9%, indicating that up to 49.2% of the active lithium ions intercalated into micron-scaled Si particles have become in-activated, no longer being able to return to the cathode side during the first discharge. As shown in FIG. 5(B), the specific capacity values of such a cell suffers from a rapid capacity decay.

Figure 5C:
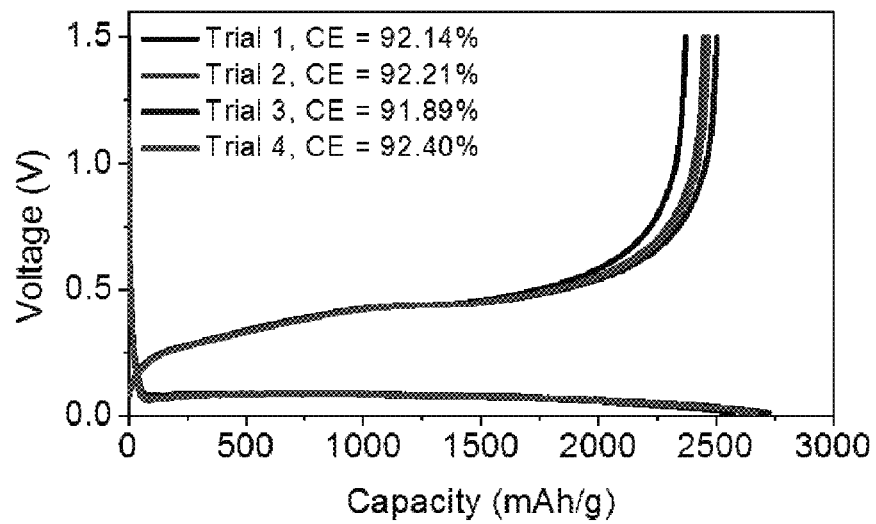
Figure 5D:
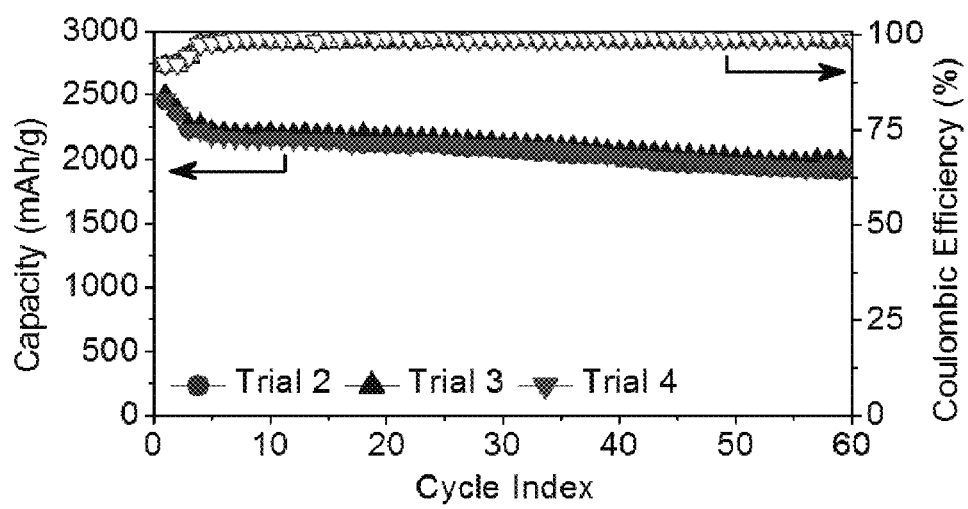

In contrast, as demonstrated FIG. 5(C), the lithium-ion cell having an anode of high-elasticity polymer matrix-protected Si particles delivers an average first-cycle Coulomb efficiency of greater than 92%, which is among the very best for all Si-based anodes reported in open literature. As shown in FIG. 5(D), such a cell also exhibits a relatively stable charge/discharge cycling behavior.

Example 2: High-Elasticity Polymer Matrix-Protected Tin Oxide Particulates

Tin oxide (SnO$_2$) nano particles were obtained by the controlled hydrolysis of SnCl$_4$.5H$_2$O with NaOH using the following procedure: SnCl$_4$.5H$_2$O (0.95 g, 2.7 m-mol) and NaOH (0.212 g, 5.3 m-mol) were dissolved in 50 mL of distilled water each. The NaOH solution was added dropwise under vigorous stirring to the tin chloride solution at a rate of 1 mL/min. This solution was homogenized by sonication for 5 m in. Subsequently, the resulting hydrosol was reacted with H$_2$SO$_4$. To this mixed solution, few drops of 0.1 M of H$_2$SO$_4$ were added to flocculate the product. The precipitated solid was collected by centrifugation, washed with water and ethanol, and dried in vacuum. The dried product was heat-treated at 400° C. for 2 h under Ar atmosphere.

For the preparation of the elastic polymer, a 1-liter flask equipped with a thermometer, a stirrer, a dropping funnel and a condenser was charged with 100 ml of tetrahydrofuran and 11.6 g (0.5 mole) of metallic sodium. To this mixture was dropwise added 55.5 g (0.55 mole) of 2,2,2-trifluoroethanol, and the mixture was then reacted under reflux until sodium was completely consumed. To this reaction mixture was dropwise added a solution of 39.6 g (0.111 mole) of hexachlorotriphosphazene in 100 ml of toluene, and the mixture was reacted under reflux for 2 hours. Thereafter, the temperature of the reaction mixture was dropped to room temperature and 191 g (1.47 mole) of HEMA was dropwise added to the reaction mixture slowly using the dropping funnel. The mixture was then heated to 60° C. and the reaction was continued for 8 hours at that temperature with stirring. Thereafter, precipitated crystalline materials and the catalyst were filtered off and the solvent in the filtrate was distilled off under reduced pressure. The residual solution was a curable phosphazene compound in the form of a solution having a yellow color.

A benzol peroxide initiator (0.5% by weight relative to the curable compound), the curable phosphazene compound, and $SnO_2$ nano particles were dispersed in toluene to form a slurry. Upon spray-drying, the resulting micro-droplets were heated at 65° C. overnight. Separately, the reacting mass was cast onto a glass surface to form several films which were cured to obtain cross-linked polymers having different degrees of cross-linking. Tensile testing was also conducted on these films. This series of cross-linked polymers can be elastically stretched up to approximately 44% (higher degree of cross-linking) to 231% (lower degree of cross-linking).

Example 3: Poly[bis(2-hydroxyethyl-methacrylate)-phosphazene] as the Encapsulating Polymer Poly[bis(2-hydroxyethyl-methacrylate)-phosphazene] was obtained by nucleophilic condensation reactions at different concentrations of the substituents. Specifically, the scheme of the poly(organophosphazenes) synthesis by nucleophilic substitution is shown in Reaction 1 earlier. The single substituted and co-substituted poly(dichlorophosphazenes) (PZs) were obtained from poly(dichlorophosphazene) by melt ring-opening polymerization of hexachloro-cyclotriphosphazene (HCCP) under vacuum at 250° C. for 3 h. After this time, the polymer was dissolved at room temperature in anhydrous THF, and it was separated by precipitation into n-heptane.

The substitution of poly(dichlorophosphazene) (PZ) with pentaerythritol triacrylate (PEATA) was made at two molar ratios: 1:3 and 1:6 mmol PZ-PEATA. Triethylamine (TEA) was added at 1:1 mmol ratio PEATA: TEA as an effective acceptor to trap hydrogen chloride. The PZ was dissolved in THF (10 mL) under stirring and, after 10 min, PEATA and TEA were added. Subsequently, the glass vial reactor was kept for two days at room temperature. The product was purified following the procedure described for PZ.

A methyl amine initiator (0.5% by weight relative to the curable compound), the as-obtained curable phosphazene compound, and anode active material particles (Si nanowires) were dispersed in toluene to form a slurry. The slurry was cured and dried in a vacuum oven at 65° C. overnight to obtain the powder of composite particulates.

Example 4: 2,2,4,4,6,6-Hexakis(vinyloxyethyl-enoxy)-2,2,4,4,6,6-hexahydro-1,3,5,2,4,6-triazatriphosphorine The compound 2,2,4,4,6,6-Hexakis(vinyloxyethyl-enoxy)-2,2,4,4,6,6-hexahydro-1,3,5,2,4,6-triazatriphosphorine is prepared by the following reactions:

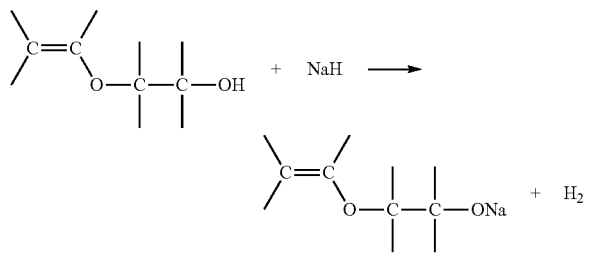

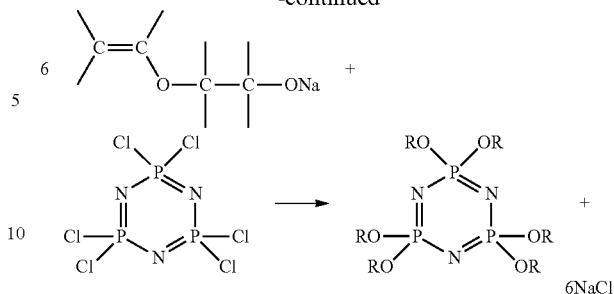

where R=the following structure:

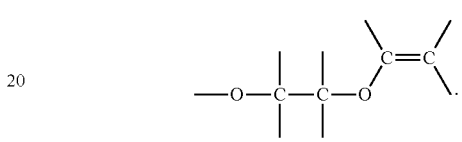

In a representative procedure, 16.80 g (0.10 mole) of sodium hydride (95%) was suspended in 700 ml of anhydrous THF and/or argon in a 2-liter three-necked flask with internal thermometer, dropping funnel, and reflux condenser. While cooling in an ice bath, 61.67 g (0.70 mole) of ethylene glycol mono-vinyl ether was then added slowly through a dropping funnel over a period of 90 min. Stirring was then continued at about 50° C. for a total of 20 h. The contents of the flask gradually exhibited a brown color.

Subsequently, a solution of 34.79 g (0.10) mole of phosphonitrile chloride $(NPCl_2)_3$ in 200 ml of anhydrous THF was added slowly (90 min) through a dropping funnel. Water bath cooling was used during this addition to keep the temperature below 30° C. Stirring was continued for 1 h at room temperature, and the batch was then heated to an internal temperature of 50° C. Stirring was continued overnight (total 24 h) at this temperature.

The mixture was then allowed to cool to room temperature and was filtered by suction. Almost all of the THF was removed from the brown filtrate in a rotary evaporator; 250 ml of diethyl ether and 250 ml of deionized water were added, and the mixture was transferred to a separatory funnel. The ether phase was separated, and the aqueous phase was extracted two more times with 125 ml portions of diethyl ether. The combined ether phases were shaken three times with 50 ml portions of deionized water, which can lighten the mixture considerably. The ether phase was separated and dried over sodium sulfate. After filtering off the drying agent and evaporating the solvent in a rotary evaporator, 62.84 g of a clear yellow liquid was obtained. The product may be further purified if so desired. The product is readily soluble in chloroform, tetrahydrofuran, diethyl ether, isopropanol, ethyl acetate, and toluene. The phosphazene derivatives herein produced was dissolved in isopropanol to produce a reactive liquid composition. Anode active material particles (Si and SiO) were then added to this reactive liquid to form a slurry. The slurry was cast on a glass slide surface and was then irradiated with electron beam at room temperature until a total dosage of 1.0-20 Gy was reached. Crosslinking of the polyphosphazene polymer was accomplished, resulting in composite particulates having elastic polymer-protected anode particles.

Additionally, polymer films without the anode particles were cast on a glass surface and some of the films were subjected to the same dosage of electron beams. The tensile elastic strains were found to be from 36% to 212%.

Example 5: Si Nano Particle- and Nanowire-Based Particulates Dispersed in a High-Elasticity Polymer Matrix from Vinyl Ether Phosphazene Derivatives Vinyl ether phosphazene derivative with mixed substitution was prepared according to the following reactions:

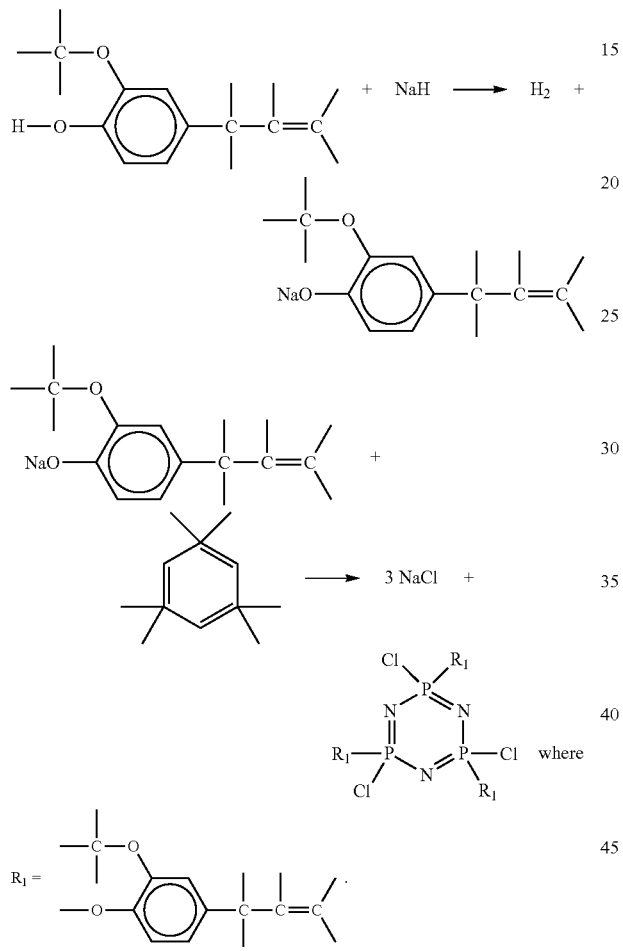

In a representative procedure, 9.60 g (0.40 mole) of sodium hydride was placed in a 1000-ml three-necked flask with KPG stirrer, dropping funnel, and internal thermometer, and was slurred with 100 ml of anhydrous tetrahydrofuran. While cooling with ice/salt, a solution of 65.68 g (0.40 mole) of eugenol in 50 ml of anhydrous tetrahydrofuran (THF) was then added dropwise (gas evolution, addition time 45 min). Stirring was continued for 1 h at room temperature, and then a solution of 46.36 g (0.133 mole) of $(NPCl_2)_3$ in 150 ml of anhydrous THF was added.

The mixture was stirred for 60 h at room temperature, transferred to a single-necked flask, and the solvent is evaporated by rotation. The product was taken up in 150 ml of diethyl ether and 150 ml of deionized water, and the phases were separated in a separatory funnel. The aqueous phase was washed twice with 10 ml portions of deionized water. The combined orange-colored ether phases were dried over anhydrous sodium sulfate. The drying agent was filtered off and the clear filtrate was stirred for 30 min at room temperature with activated charcoal. After repeated filtration and solvent removal by rotary evaporation, 94.94 g (0.130 mole, corresponding to 98% of the theoretical amount) of a viscous, clear, brown-colored liquid was obtained. The product may be further filtered through a short silica gel column if so desired. The product has a molecular weight 730.89 g/mole and is readily soluble in toluene, chloroform, ethyl acetate, diethyl ether, tetrahydrofuran, and acetone, etc.

The vinyl ether phosphazene derivatives herein produced, along with a lithium salt (e.g., 10% lithium borofluoride ($LiBF_4$) relative to the reactive polymer) and graphene-coated Si particles (the anode active material), were then dissolved/dispersed in a solvent mixture of acetone and ethyl acetate (EA) to obtain a slurry. The slurry was cured and dried in a vacuum oven at 65° C. overnight. Powder of composite particulates was obtained by low-intensity ball-milling of the resulting product.

Example 6: A polyphosphazene $[NP(NHR)_2]_N$ with Oligo[Propylene Oxide] Side Chains —R=[CH($CH_3$)—$CH_2O]_m$—$CH_3$ (m=6-10) as an Encapsulating Polymer A high-elasticity polyphosphazene polymer was prepared from $[NPCl_2]_n$ and a propylene oxide oligomer according to the following reaction:

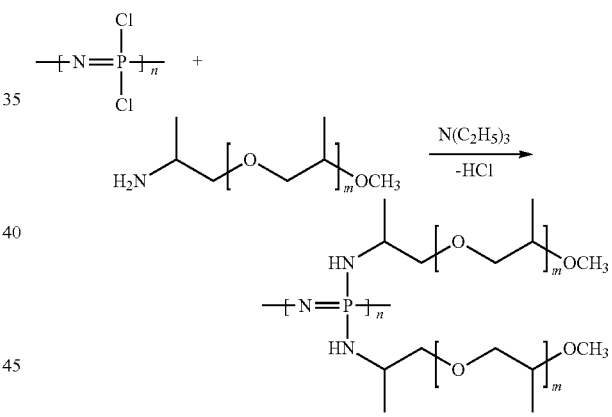

In a representative procedure, 4.69 g of $[NPCl_2]_n$ were dissolved in 200 ml of anhydrous THF to form a polymer solution. Then, 11.3 ml of triethyl amine (TEA) and 50 ml of propylene oxide oligomer were then added to the polymer solution. The resulting reaction mixture was stirred for 24 h at room temperature. The solvent was then removed under vacuum yielding a highly viscous yellowish polymer solution which was dialyzed against water for 5 days. Removal of water after dialysis yielded a slightly yellowish, highly viscous polymer. This polymer, after mixing with anode material particles, was cross-linked by LUV radiation in the presence of dissolved benzophenone as photoinitiator.

Cross linking was carried out as follows: 0.5 g of the as-obtained viscous polymer was dissolved in 4 ml freshly distilled THE. Up to 10 mol. % of benzophenone was then added and the solution was stirred for 1 h. Particles of an anode active material were then added to the solution to form a slurry. Finally, it was poured into a glass container and dried in an oven at 60° C. for 48 h. The material was irradiated under inert atmosphere with an unfiltered UV light source for 15 min at a distance of 7 cm (low-pressure mercury lamp, 500 W). With some simple grinding, one obtained powder of composite particulates.

On a separate basis, neat polymer films containing no anode particles were prepared under comparable conditions for tensile testing. This series of cross-linked polymers can be elastically stretched up to approximately 35% (higher degree of cross-linking) to 311% (lower degree of cross-linking).

Example 7: Poly[bis 2-(2-(2-methoxyethoxy) ethoxy)ethoxyphosphazene] (MEEEP)

A polyphosphazene based electrolyte membranes including a linear polymer with —(N=PR$_2$)— units, grafted with ethylene oxide side chains of the type R=—(OCH$_2$CH$_2$)$_3$OCH$_3$ was prepared according to the following reaction:

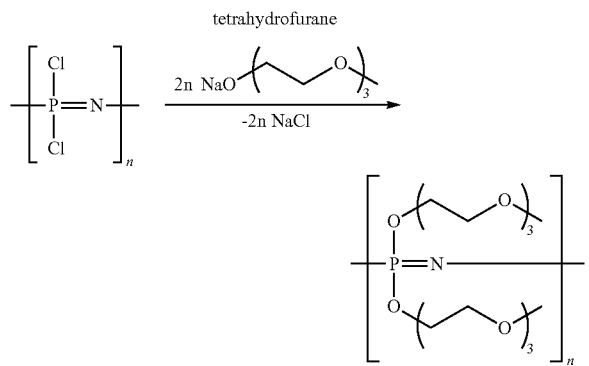

As a representative procedure, 3.6 g (150 mmol) of sodium hydride was suspended in 120 mL tetrahydrofurane and cooled to 0° C. The freshly distilled 2-(2-(2-methoxy-ethoxy)ethoxy)ethanol was added drop wise and the suspension was stirred for 1 h under hydrogen gas evolution. Then 8.7 g (74.9 mmol) of precursor polymer (—(N=PR$_2$)—) dissolved in 50 mL tetrahydrofurane was added to the meanwhile clear solution and stirred for 24 h, while sodium chloride precipitated. Excess solvent was removed in a rotary evaporator. The product was purified in a dialysis tube against distilled water. After a final evaporation of water and drying at 50° C. under vacuum for 2 h, one obtained the highly viscous, yellow honey like poly[bis(2-(2-(2-methoxyethoxy) ethoxy)ethoxy phosphazene)] (MEEEP).

A solution of MEEEP in tetrahydrofurane was added with 5 wt % benzophenone to form a solution. A desired amount of anode active material particles was allowed to dip into the solution for 10$^{-30}$ seconds and then retreated. After this dip-coating procedure, the coated particles were sprayed onto a glass surface. The powder was exposed to UV-irradiation for 20 minutes. Using 5 wt. % benzophenone, a cross-linking degree of 10% was obtained with reference to the monomer units (—NPR$_2$—). All samples were dried again after cross-linking for at least 48 h at 70° C. and then stored in a glove box under dry argon prior to use.

This series of cross-linked polymers (without anode particles) can be elastically stretched up to approximately 56% (higher degree of cross-linking) to 288% (lower degree of cross-linking).

The present study led to the following additional observations:
(1) The high-elasticity polymer matrix embedding or shell encapsulating strategy is surprisingly effective in alleviating the anode expansion/shrinkage-induced capacity decay problems. Such a strategy appears to have significantly reduced or eliminated the possibility of repeated SEI formation and breakage that would otherwise continue to consume electrolyte and active lithium ions.
(2) It is quite surprising that an inorganic-organic hybrid material such as a phosphazene polymer can be so elastic and lithium ion-conducting (even without the presence of a lithium salt), having a lithium ion conductivity typically in the range from $10^{-6}$ to $10^{-3}$ S/cm at room temperature.
(3) The encapsulation of high-capacity anode active material particles by carbon or other protective materials without high elasticity polymer protection does not provide much benefit in terms of improving cycling stability of a lithium-ion battery.

We claim:
1. A composite particulate for a lithium battery, wherein said composite particulate has a diameter from 10 nm to 50 μm and comprises one or more than one anode active material particles that are dispersed in a high-elasticity polymer matrix or encapsulated by a high-elasticity polymer shell, wherein said high-elasticity polymer matrix or shell has a recoverable elastic tensile strain no less than 5%, when measured without an additive or reinforcement dispersed therein, and a lithium ion conductivity no less than 10$^{-6}$ S/cm at room temperature and wherein said high-elasticity polymer comprises a crosslinked polymer network of chains derived from a phosphazene compound, wherein an anode active material is selected from the group consisting of: (a) silicon (Si), germanium (Ge), tin (Sn), lead (Pb), antimony (Sb), phosphorus (P), bismuth (Bi), zinc (Zn), aluminum (Al), titanium (Ti), nickel (Ni), cobalt (Co), and cadmium (Cd); (b) alloys or intermetallic compounds of Si, Ge, Sn, Pb, Sb, Bi, Zn, Al, Ti, Ni, Co, or Cd with other elements; (c) oxides, carbides, nitrides, sulfides, phosphides, selenides, and tellurides of Si, Ge, Sn, Pb, Sb, Bi, Zn, Al, Ti, Fe, Ni, Co, V, or Cd, and their mixtures, composites, or lithium-containing composites; (d) salts and hydroxides of Sn; (e) lithium titanate, lithium manganate, lithium aluminate, lithium titanium niobium oxide, lithium-containing titanium oxide, lithium transition metal oxide, ZnCo$_2$O$_4$; (f) carbon or graphite particles (g) prelithiated versions thereof; and (h) combinations thereof.

2. The composite particulate of claim 1, wherein the phosphazene compound is synthesized from a precursor monomer, oligomer, or reactive polymer selected from Chemical formula 1, Chemical formula 2, Chemical formula 3, Chemical formula 4, or a combination thereof:

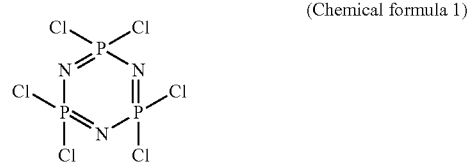
(Chemical formula 1)

(Chemical formula 2)

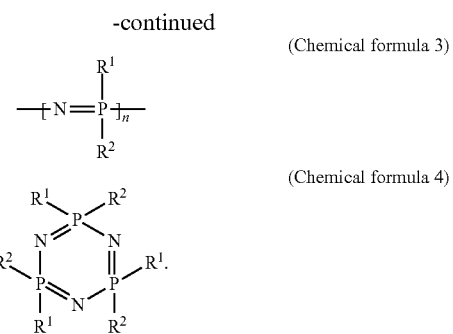

(Chemical formula 3)

(Chemical formula 4)

wherein R, $R^1$ and $R^2$ are independently selected from an organic group or an organometallic group.

3. The composite particulate of claim 1, wherein said high-elasticity polymer contains a cross-linked network of a phosphazene compound crosslinked by a crosslinking agent to a degree of crosslinking that imparts an elastic tensile strain from 5% to 500%.

4. The composite particulate of claim 3, wherein said crosslinking agent is selected from poly(diethanol)diacrylate, poly(ethyleneglycol)dimethacrylate, poly(diethanol) dimethylacrylate, poly(ethylene glycol)diacrylate, N,N-methylene bisacrylamide, epichlorohydrin, 1,4-butanediol diglycidyl ether, tetrabutylammonium hydroxide, cinnamic acid, ferric chloride, aluminum sulfate octadecahydrate, diepoxy, dicarboxylic acid compound, poly (potassium 1-hydroxy acrylate) (PKHA), glycerol diglycidyl ether (GDE), ethylene glycol, polyethylene glycol, polyethylene glycol diglycidyl ether (PEGDE), citric acid, acrylic acid, methacrylic acid, a derivative compound of acrylic acid, a derivative compound of methacrylic acid, glycidyl functions, ',N'-Methylenebisacrylamide (MBAAm), Ethylene glycol dimethacrylate (EGDMAAm), isobornyl methacrylate, poly (acrylic acid) (PAA), methyl methacrylate, isobornyl acrylate, ethyl methacrylate, isobutyl methacrylate, n-Butyl methacrylate, ethyl acrylate, 2-Ethyl hexyl acrylate, n-Butyl acrylate, a diisocyanate, an urethane chain, a chemical derivative thereof, or a combination thereof.

5. The composite particulate of claim 3, wherein the polyphosphazene is crosslinked by a crosslinking agent that comprises a compound having at least one reactive group selected from a phenylene group, a hydroxyl group, an amino group, an imino group, an amide group, an acrylic amide group, an amine group, an acrylic group, an acrylic ester group, or a mercapto group in the molecule.

6. The composite particulate of claim 1, wherein said high-elasticity polymer matrix or shell further contains from 0.01% to 30% by weight of a graphite, graphene, or carbon material dispersed therein.

7. The composite particulate of claim 6, wherein said graphite, graphene, or carbon material is selected from polymeric carbon, amorphous carbon, chemical vapor deposition carbon, coal tar pitch, petroleum pitch, meso-phase pitch, carbon black, coke, acetylene black, activated carbon, graphite particles, carbon particles, meso-phase microbeads, carbon or graphite fibers, carbon nanotubes, carbon nanofibers, graphitic nano-fibers, graphene sheets, or a combination thereof and said graphite, graphene, or carbon material forms a 3D network of electron-conducting pathways that are in electronic contacts with said anode material particles.

8. The composite particulate of claim 1, wherein said anode active material contains a prelithiated Si, prelithiated Ge, prelithiated Sn, prelithiated $SnO_x$, prelithiated $SiO_x$, prelithiated iron oxide, prelithiated $V_2O_5$, prelithiated $V_3O_8$, prelithiated $Co_3O_4$, prelithiated $Ni_3O_4$, or a combination thereof, wherein x=1 to 2.

9. The composite particulate of claim 1, wherein said anode active material particles or the composite particulates, or both, are porous.

10. The composite particulate of claim 1, wherein one or a plurality of said particles is coated with a layer of carbon or graphene disposed between said one or said plurality of particles and said high-elasticity polymer matrix.

11. The composite particulate of claim 1, wherein said high-elasticity polymer has a lithium ion conductivity from $10^{-6}$ S/cm to $10^{-2}$ S/cm.

12. The composite particulate of claim 1, wherein said composite particulate is further coated with or encapsulated by a shell of conducting material selected from carbon, graphene, a conducting polymer, a conducting composite, or a combination thereof.

13. The composite particulate of claim 1, wherein said high-elasticity polymer matrix or shell further comprises from 0.1% to 50% by weight of a lithium ion-conducting additive dispersed therein.

14. The composite particulate of claim 1, wherein said high-elasticity polymer forms a mixture or co-polymer with an elastomer selected from natural polyisoprene, synthetic polyisoprene, polybutadiene, chloroprene rubber, polychloroprene, butyl rubber, styrene-butadiene rubber, nitrile rubber, ethylene propylene rubber, ethylene propylene diene rubber, epichlorohydrin rubber, polyacrylic rubber, silicone rubber, fluorosilicone rubber, perfluoroelastomers, polyether block amides, chlorosulfonated polyethylene, ethylene-vinyl acetate, thermoplastic elastomer, protein resilin, protein elastin, ethylene oxide-epichlorohydrin copolymer, polyurethane, urethane-urea copolymer, or a combination thereof.

15. The composite particulate of claim 1, wherein said high-elasticity polymer contains a lithium ion-conducting additive dispersed therein wherein said lithium ion-conducting additive is selected from $Li_2CO_3$, $Li_2O$, $Li_2C_2O_4$, LiOH, LiX, $ROCO_2Li$, HCOLi, ROLi, $(ROCO_2Li)_2$, $(CH_2OCO_2Li)_2$, $Li_2S$, $Li_xSO_y$, or a combination thereof, wherein X=F, Cl, I, or Br, R=a hydrocarbon group, $0<x\leq1$, $1\leq y\leq4$.

16. The composite particulate of claim 1, wherein said high-elasticity polymer further comprises a lithium ion-conducting additive dispersed therein and said additive is selected from lithium perchlorate ($LiClO_4$), lithium hexafluorophosphate ($LiPF_6$), lithium borofluoride ($LiBF_4$), lithium hexafluoroarsenide ($LiAsF_6$), lithium trifluoromethanesulfonate ($LiCF_3SO_3$), bis-trifluoromethyl sulfonylimide lithium ($LiN(CF_3SO_2)_2$), lithium bis (oxalato) borate (LiBOB), lithium oxalyldifluoroborate ($LiBF_2C_2O_4$), lithium nitrate ($LiNO_3$), Li-fluoroalkyl-phosphate ($LiPF_3(CF_2CF_3)_3$), lithium bisperfluoro-ethylsulfonylimide (LiBETI), lithium bis(trifluoromethanesulfonyl) imide, lithium bis(fluorosulfonyl) imide, lithium trifluoromethanesulfonimide (LiTFSI), an ionic liquid-based lithium salt, or a combination thereof.

17. The composite particulate of claim 1, wherein the high-elasticity polymer forms a mixture or blend with a lithium ion-conducting polymer selected from poly (ethylene oxide) (PEO), Polypropylene oxide (PPO), poly (acrylonitrile) (PAN), poly (methyl methacrylate) (PMMA), poly (vinylidene fluoride) (PVdF), Poly bis-methoxy ethoxyethoxide-phosphazene, Polyvinyl chloride, Polydimethylsiloxane, poly (vinylidene fluoride)-hexafluoropropylene (PVDF-HFP), a sulfonated derivative thereof, or a combination thereof.

18. The composite particulate of claim 1, wherein an anode active material is lithiated to contain from 0.1% to 54.7% by weight of lithium.

19. An anode comprising multiple composite particulates as defined in claim 1 as an anode material.

20. A lithium battery comprising the anode of claim 19, a cathode, and an electrolyte in ionic contact with said anode and said cathode.

21. The lithium battery of claim 20, which is a lithium-ion battery, lithium metal battery, lithium-sulfur battery, lithium-selenium battery, or lithium-air battery.

22. The lithium battery of claim 20, further including a porous separator that electrically isolates said anode from said cathode.

23. A method of manufacturing multiple composite particulates of claim 1, said method comprising:
  (a) Dispersing multiple particles of an anode active material in a precursor polymer solution to form a suspension wherein these particles are fully embedded or immersed in said precursor solution, which comprises at least a curing agent dissolved or dispersed in a reactive liquid medium that comprises a reactive phosphazene compound, in a form of monomer, oligomer or reactive polymer;
  (b) operating a secondary particle-forming procedure to shape the suspension into multiple droplets and remove the liquid solvent from the droplets; and
  (c) curing the reactive phosphazene compound to form said composite particulates wherein a particulate comprises one or a plurality of anode active material particles that are dispersed and embedded in a polymer matrix or encapsulated by a polymer shell.

24. The method of claim 23, wherein said secondary particle-forming procedure comprises a procedure selected from solution dipping, coating or casting on a solid substrate, pan-coating, air-suspension coating, centrifugal extrusion, vibration-nozzle encapsulation, spray-drying, coacervation-phase separation, interfacial polycondensation or interfacial cross-linking, in-situ polymerization, matrix polymerization, extrusion and palletization, or a combination thereof.

25. The method of claim 23, wherein said suspension in step (a) further comprises an elastomer or its precursor, an electronically conductive polymer or its precursor, a lithium-ion conducting material, a reinforcement material, a foaming or blowing agent, or a combination thereof that is dispersed therein.

26. The method of claim 23, wherein said anode active material particles, prior to step (a), are pre-coated with a layer of carbon, graphene, a conducting polymer, a conducting composite, or a combination thereof.

27. The method of claim 23, wherein the reactive liquid medium further includes a non-aqueous liquid solvent.

28. A composite particulate for a lithium battery, wherein said composite particulate has a diameter from 10 nm to 50 µm and comprises one or more than one anode active material particles that are dispersed in a high-elasticity polymer matrix or encapsulated by a high-elasticity polymer shell, wherein said high-elasticity polymer matrix or shell has a recoverable elastic tensile strain no less than 5%, when measured without an additive or reinforcement dispersed therein, and a lithium ion conductivity no less than $10^{-8}$ S/cm at room temperature and wherein said high-elasticity polymer comprises a crosslinked polymer network of chains derived from a phosphazene compound, wherein said high-elasticity polymer matrix comprises a polyphosphazene selected from the groups consisting of (a) linear polymers having the formula $(N=PR^1R^2)_n$, where $R^1$ and $R^2$ are organic; (b) cyclolinear and cyclomatrix polymers in which small phosphazene rings are connected together by organic chain units; (c) block copolymer, star, dendritic, or comb-type structures; and combinations thereof.

* * * * *

UNITED STATES PATENT AND TRADEMARK OFFICE
CERTIFICATE OF CORRECTION

PATENT NO. : 12,278,371 B2
APPLICATION NO. : 17/166026
DATED : April 15, 2025
INVENTOR(S) : Bor Z. Jang Page 1 of 1

It is certified that error appears in the above-identified patent and that said Letters Patent is hereby corrected as shown below:

In the Claims

Column 38, Line 31 reads:
"therein, and a lithium ion conductivity no less than $10^0$ S/cm"
Should read:
"therein, and a lithium ion conductivity no less than $10^{-8}$ S/cm"

Signed and Sealed this
Twenty-fourth Day of June, 2025

Coke Morgan Stewart
*Acting Director of the United States Patent and Trademark Office*